(12) United States Patent
Liu et al.

(10) Patent No.: US 12,704,665 B2
(45) Date of Patent: Aug. 11, 2026

(54) OPTICAL SYSTEM INCLUDING LIGHT CONTROL FILM AND FRESNEL LENS

(71) Applicant: 3M INNOVATIVE PROPERTIES COMPANY, St. Paul, MN (US)

(72) Inventors: Tao Liu, Woodbury, MN (US); Shu-Ching Fan, Woodbury, MN (US); Gary T. Boyd, Woodbury, MN (US); David Scott Thompson, Bayport, MN (US); Caleb T. Nelson, McKinney, TX (US); Tri D. Pham, Woodbury, MN (US); Adam T. Ringberg, St Paul, MN (US); Daniel J. Schmidt, Woodbury, MN (US); Owen M. Anderson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 301 days.

(21) Appl. No.: 18/557,199

(22) PCT Filed: Apr. 14, 2022

(86) PCT No.: PCT/IB2022/053553
§ 371 (c)(1),
(2) Date: Oct. 25, 2023

(87) PCT Pub. No.: WO2022/238781
PCT Pub. Date: Nov. 17, 2022

(65) Prior Publication Data

US 2024/0210600 A1 Jun. 27, 2024

Related U.S. Application Data

(60) Provisional application No. 63/186,288, filed on May 10, 2021.

(51) Int. Cl.
*G02B 3/08* (2006.01)
*G02B 5/02* (2006.01)

(52) U.S. Cl.
CPC *G02B 3/08* (2013.01); *G02B 5/02* (2013.01)

(58) Field of Classification Search
CPC ........ G02B 6/00; G02B 6/005; G02B 6/0035; G02B 6/0011; G02B 6/0005;
(Continued)

(56) References Cited

U.S. PATENT DOCUMENTS 5,175,030 A 12/1992 Lu et al.
5,183,597 A 2/1993 Lu
(Continued)

FOREIGN PATENT DOCUMENTS

CN 101903809 A 12/2010
CN 103298603 A 9/2013
(Continued)

OTHER PUBLICATIONS

English translation of JP 2020042182. (Year: 2020).*
(Continued)

*Primary Examiner* — Jie Lei
(74) *Attorney, Agent, or Firm* — Clifton F. Richardson; Theresa Stadheim

(57) ABSTRACT

An optical system includes an optical film curved about a first axis and a light control film curved about the first axis and substantially coextensive with the optical film. The optical film includes a first layer including a microstructured first major surface where the microstructured first major surface defines a linear Fresnel lens including a plurality of Fresnel elements extending along the first axis. The first major surface of the optical film faces the light control film. The light control film includes a plurality of spaced apart optically absorptive regions extending along the first axis
(Continued)

and along a direction substantially normal to a major surface of the light control film. At least one of the optical film or at least one layer disposed between the optical film and the light control film includes at least one reflection mitigation element.

20 Claims, 23 Drawing Sheets

(58) Field of Classification Search

CPC ...... G02B 6/0036; G02B 6/0016; G02B 6/08; G02B 5/003; G02B 5/02; G02B 5/04; G02B 3/08; G02B 2207/123; G02F 1/1335; G02F 1/1334; G02F 1/133512; G02F 1/133524; G02F 1/133562; G02F 1/13338; G02F 1/1323; G02F 1/133504

USPC ....... 359/708, 566, 567, 569, 563, 742, 707, 359/451, 457

See application file for complete search history.

(56) References Cited

U.S. PATENT DOCUMENTS

| | | | |
|---|---|---|---|
| 7,510,462 | B2 | 3/2009 | Bryan et al. |
| 8,213,082 | B2 | 7/2012 | Gaides et al. |
| 8,234,998 | B2 | 8/2012 | Krogman et al. |
| 8,313,798 | B2 | 11/2012 | Nogueira et al. |
| 8,460,568 | B2 | 6/2013 | David et al. |
| 8,657,472 | B2 | 2/2014 | Aronson et al. |
| 8,808,811 | B2 | 8/2014 | Kolb et al. |
| 9,063,284 | B2 | 6/2015 | Jones et al. |
| 9,335,449 | B2 | 5/2016 | Gaides et al. |
| 10,365,415 | B2 | 7/2019 | Schmidt |
| 10,605,965 | B2 | 3/2020 | Pham et al. |
| 2006/0114569 | A1 | 6/2006 | Capaldo et al. |
| 2008/0002256 | A1 | 1/2008 | Sasagawa et al. |
| 2009/0059126 | A1 | 3/2009 | Koganezawa |
| 2011/0064936 | A1 | 3/2011 | Hammond et al. |
| 2019/0219743 | A1 | 7/2019 | Pham |
| 2020/0049864 | A1 | 2/2020 | Huang |
| 2020/0319388 | A1 | 10/2020 | Ambur |

FOREIGN PATENT DOCUMENTS

| | | | | |
|---|---|---|---|---|
| CN | 107615105 A | | 1/2018 | |
| CN | 111344613 A | | 6/2020 | |
| JP | 2020042182 | * | 3/2020 | .............. G02B 3/08 |
| TW | 200533952 A | | 10/2005 | |
| WO | 2019118685 A1 | | 6/2019 | |
| WO | 2019135190 A1 | | 7/2019 | |
| WO | 2020026139 A1 | | 2/2020 | |
| WO | 2020/261027 A1 | | 12/2020 | |
| WO | 2020241075 A1 | | 12/2020 | |
| WO | 2021090129 A1 | | 5/2021 | |
| WO | 2021090130 A1 | | 5/2021 | |

OTHER PUBLICATIONS

International Search Report received for PCT International Application No. PCT/IB2022/053553, mailed on Sep. 2, 2022, 4 pages.

* cited by examiner

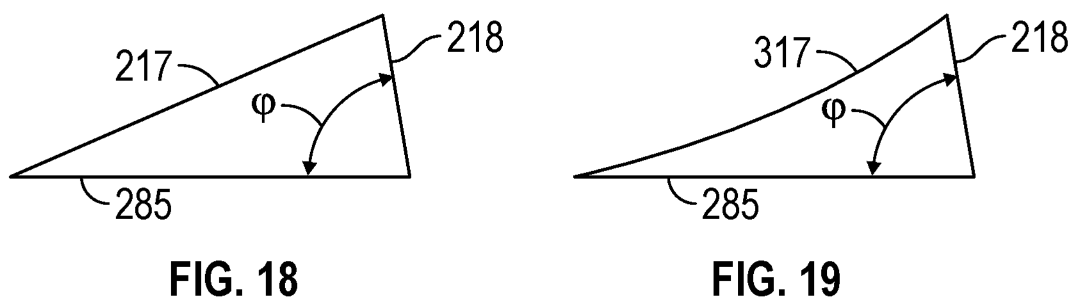
FIG. 18
FIG. 19
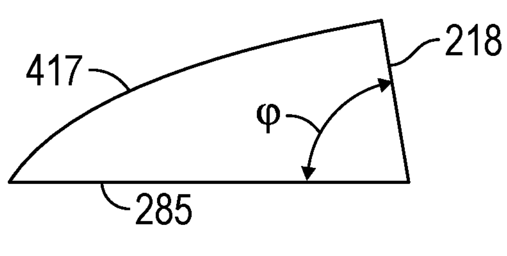
FIG. 20
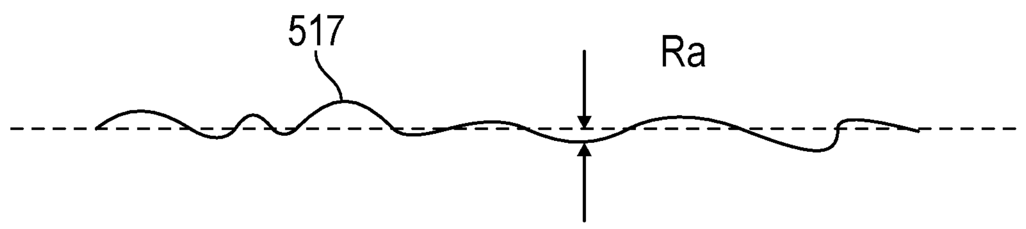
FIG. 21

OPTICAL SYSTEM INCLUDING LIGHT CONTROL FILM AND FRESNEL LENS

CROSS REFERENCE TO RELATED APPLICATIONS

This application is a national stage filing under 35 U.S.C. 371 of PCT/IB2022/053553, filed Apr. 14, 2022, which claims the benefit of U.S. Application No. 63/186,288, filed May 10, 2021, the disclosures of which are incorporated by reference in their entireties herein.

BACKGROUND

A light control film can include alternating optically transmissive and optically absorptive regions and can be used to regulate the directionally of light transmitted through the film.

A display surface can be curved.

SUMMARY

In some aspects, the present disclosure provides an optical system including a light source, an optical film curved about a first axis, and a light control film curved about the first axis and substantially coextensive with the optical film. The optical film includes a first layer including a microstructured first major surface where the microstructured first major surface defines a linear Fresnel lens including a plurality of Fresnel elements extending along the first axis. The light control film is disposed between the light source and the optical film. The first major surface of the optical film faces the light control film. The light control film includes a plurality of spaced apart optically absorptive regions extending along the first axis and along a direction substantially normal to a major surface of the light control film. At least one of the optical film or at least one layer disposed between the optical film and the light control film includes at least one reflection mitigation element.

In some aspects, the present disclosure provides an optical system including an optical film curved about a first axis and a light control film disposed proximate the optical film. The optical film includes a first layer including a microstructured first major surface where the microstructured first major surface defines a linear Fresnel lens including a plurality of Fresnel elements extending along the first axis. Each Fresnel element includes an optical facet and a sidewall meeting the optical facet at a ridge of the Fresnel element. For each Fresnel element in at least a majority of the Fresnel elements, an optically absorptive layer is disposed on and substantially covers the sidewall. The optically absorptive layer has an average thickness t, where 100 nm<t<1 micrometer. The light control film is curved about the first axis and is substantially coextensive with the optical film. The first major surface of the optical film faces the light control film. The light control film includes a plurality of spaced apart optically absorptive regions extending along the first axis and along a direction substantially normal to a major surface of the light control film. At least one of the optical film or at least one layer disposed between the optical film and the light control film includes at least one reflection mitigation element.

In some aspects, the present disclosure provides an optical film including a first layer having a microstructured first major surface where the microstructured first major surface defines a linear Fresnel lens including a plurality of Fresnel elements, and a second layer disposed on, and having a major surface facing and substantially conforming to, the first major surface of the first layer. The second layer bonds the optical film to the light control film. In some embodiments, the second layer has a lower refractive index than the first layer for at least one wavelength in a range of about 400 nm to about 700 nm. The optical film includes at least one reflection mitigation element.

These and other aspects will be apparent from the following detailed description. In no event, however, should this brief summary be construed to limit the claimable subject matter.

BRIEF DESCRIPTION OF THE DRAWINGS

FIGS. 18-20 are schematic cross-sectional views of Fresnel elements, according to some embodiments.

FIG. 21 is a schematic illustration of mean deviation surface roughness, according to some embodiments.

DETAILED DESCRIPTION

Figure 1:
FIGS. 1-3 are schematic cross-sectional views of optical systems, according to some embodiments.
Figure 1:
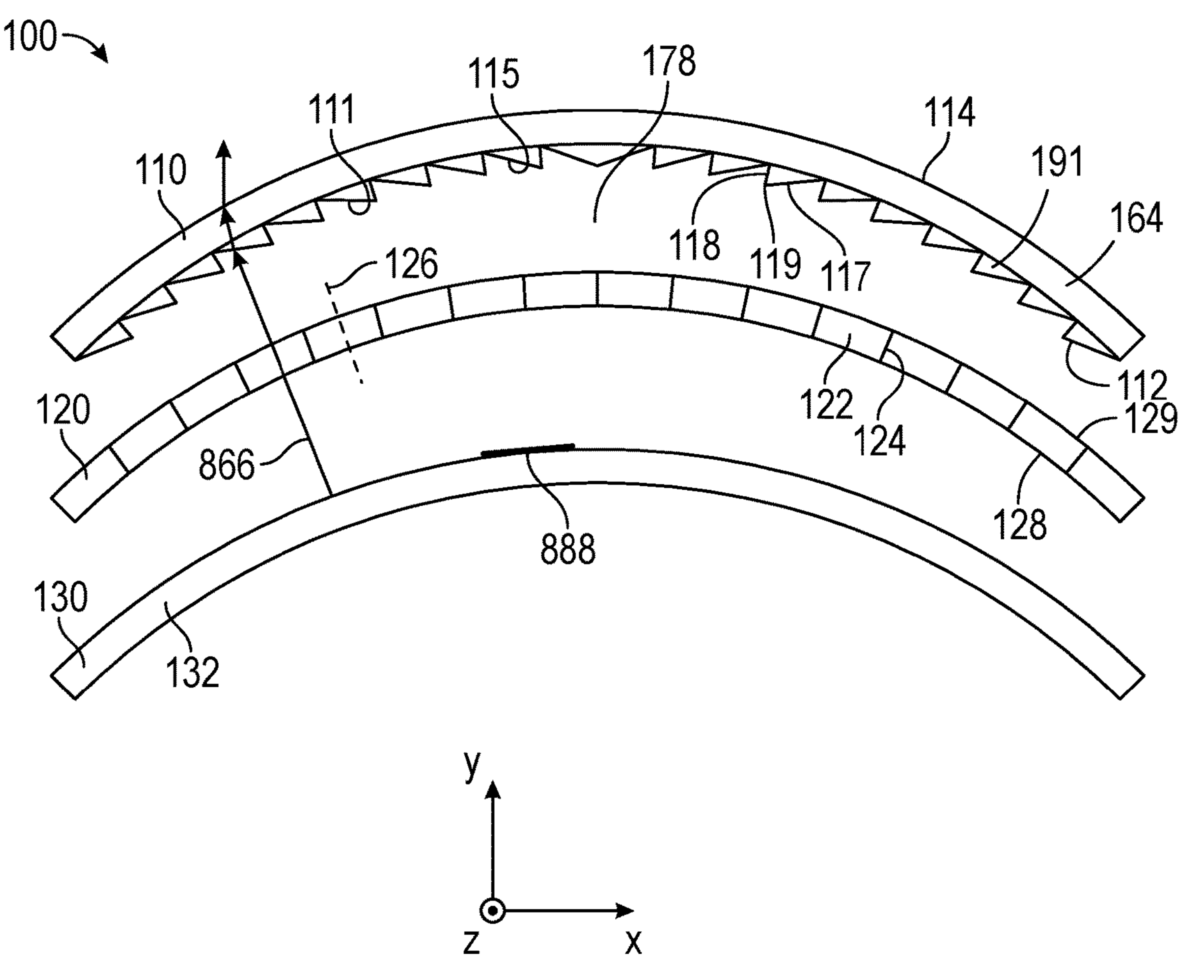

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A light control film, which may also be referred to as a collimating film or a privacy filter, can be used to regulate the directionally of light transmitted through the film. A light control film can be placed on a curved display, for example, to filter the light output of the display. However, it is typically desired to alter the directionality of the transmitted light compared to using a traditional light control film placed onto the curved display surface (e.g., so that light is directed primarily toward a viewer rather than primarily along a normal to the display surface). This can be done by altering the tilt of the louvers (e.g., light absorptive regions) of the light control film as described in International Application Publication No. WO 2020/261027 (Liu et al.), for example. Alternatively, a linear Fresnel lens may be placed on a conventional light control film to alter the directionality of the transmitted light. However, it has been found that this can result in an undesired bright band at higher view angles. According to some embodiments of the present description, it has been found that a Fresnel lens can be positioned in an optical system such that the Fresnel elements face the light control film, and this can reduce or substantially eliminate the bright band at higher view angles.

Further, it has been found, according to some embodiments, that an optically absorptive layer can be disposed on the sidewalls of the Fresnel elements to reduce undesired redirection of light by the sidewalls. Utilizing thin optically absorptive layers has been found to reduce undesired effects (e.g., blocking light incident on an edge of the layer that would be desired to be transmitted) of the optically absorptive layers. When the optically absorptive layer is thin, it preferably has a relatively high extinction coefficient in order to efficiently absorb light. In some cases, the high extinction coefficient can produce a reflective, metal-like interface with the sidewall. It has been found that adding a cladding layer (e.g., a layer having an extinction coefficient less than that of the optically absorptive layer and greater than that of the sidewall material) between a high extinction coefficient absorbing layer and the sidewall can reduce reflectivity and thereby reduce undesired light redirection by the sidewalls.

Further, it has been found, according to some embodiments, that the reflection of ambient light may be objectionable in some cases due, in part, to dispersion of one or more layers of the optical film which can result in color separation (e.g., a rainbow pattern) in the reflected light. For example, the material used to form Fresnel elements in an optical film can have a higher refractive index for blue wavelengths than for red wavelengths. However, it has been found, according to some embodiments, that including one or more reflection mitigation elements can reduce the objectionable effect. As used herein, a "reflection mitigation element" is any element that reduces undesired effects of reflection. A reflection mitigation element can be diffusive according to some embodiment so that the reflected light is less specular and so less objectionable in some cases and/or a reflection mitigation element can be anti-reflective to reduce the overall level of reflection. Suitable reflection mitigation elements can include, for example, one or more of a structured (e.g., microstructured) surface or interface, an optically diffusive layer (e.g., beads or particles dispersed in a binder), or an antireflection coating which may be disposed at a surface or an interface.

Figure 2:
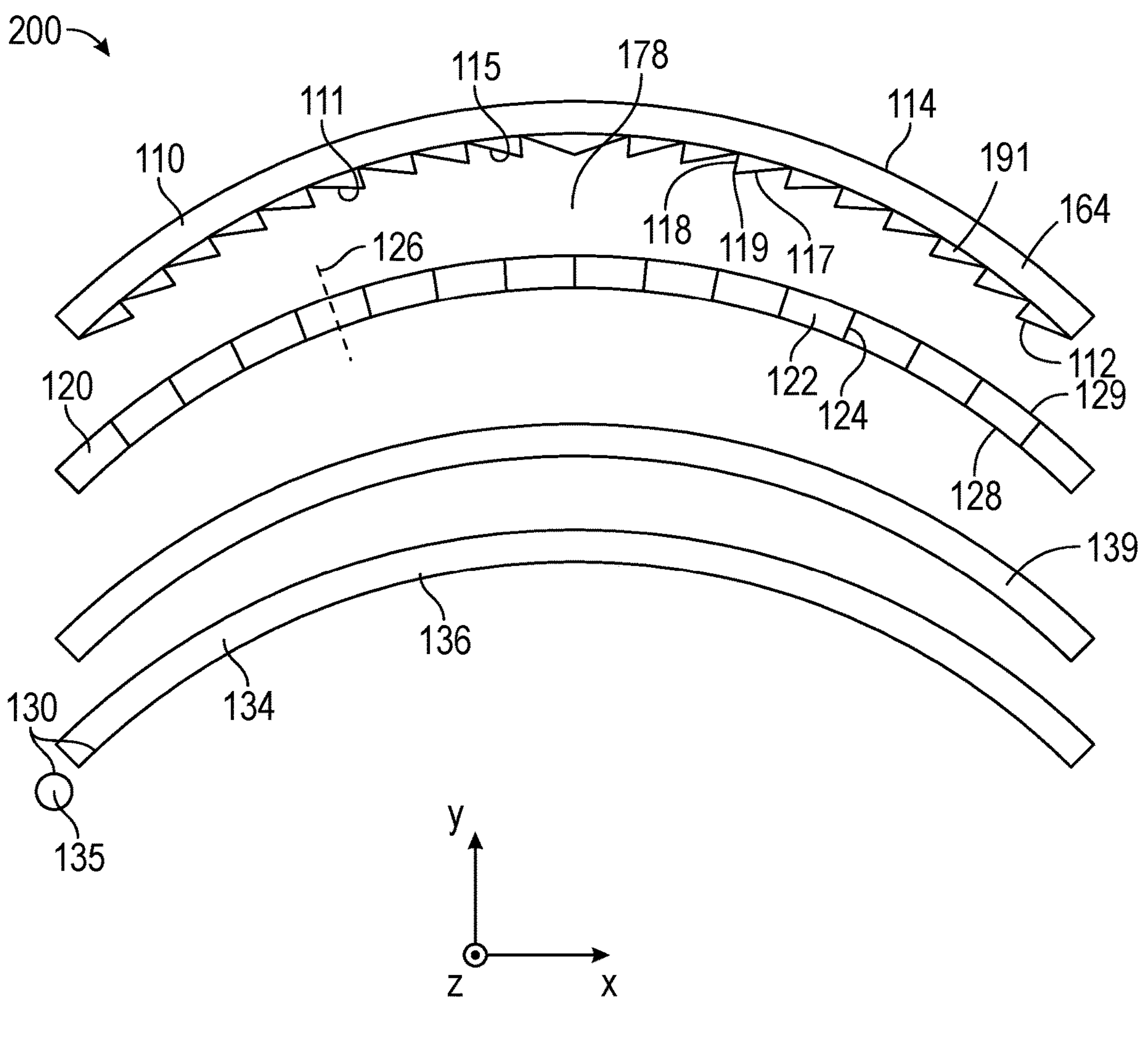
Figure 3:
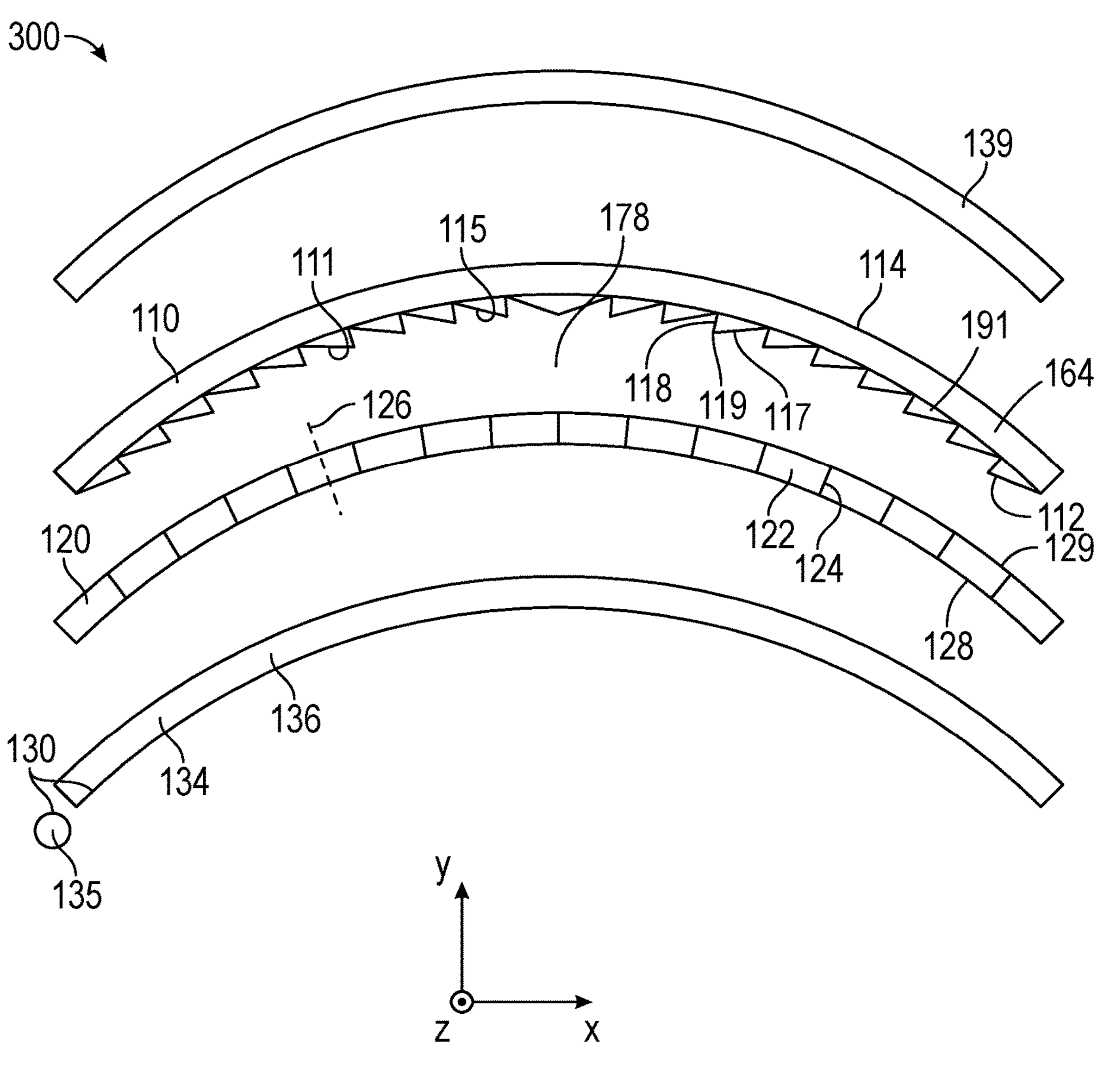

FIGS. 1-3 are schematic cross-sectional views of optical systems 100, 200, and 300, respectively. The optical system 100, 200, 300 includes an optical film 110 curved about a first axis (z-axis) and a light control film 120 curved about the first axis. The light control film 120 can be substantially coextensive with the optical film 110 (e.g., at least about 60%, or at least about 80%, or at least about 90% by area of each of the light control film 120 and the optical film 110 can be coextensive with each other). The optical film 110 includes a first layer 191 including a microstructured first major surface 112. The optical film 110 can further include a substrate 164 where the first layer 191 is disposed on the substrate 164 with the first major surface 112 of the first layer 191 facing away from the substrate 164, The optical film can include a second major surface 114 opposite the first major surface 112 where the second major surface 114 can be a major surface of the substrate 164 facing away from the first layer 191. The microstructured first major surface 112 defines a linear Fresnel lens 111 including a plurality of Fresnel elements 115 extending longitudinally along the first axis. The light control film 120 can be disposed proximate the optical film 110 with the first major surface 112 of the optical film 110 facing the light control film 120. In some embodiments, the optical system includes a light source 130. The light control film 120 can be disposed between the light source 130 and the optical film 110 with the first major surface 112 of the optical film 110 facing the light control film 120. The light control film 120 includes a plurality of alternating optically transmissive 122 and optically absorptive 124 regions extending longitudinally along the first axis such that in a cross-section (x-y cross-section) orthogonal to the first axis, for at least a majority of the optically transmissive regions 122, a centerline 126 between adjacent optically absorptive regions is substantially normal (e.g., within 20 degrees, or within 10 degrees, or within 5 degrees, or within 3 degrees, or within 2 degrees of normal) to a major surface 128 and/or 129 of the light control film 120. Alternatively, or in addition, the optically absorptive regions 124 may be described as extending along the first axis (z-axis) and along a direction substantially normal to a major surface of the light control film (e.g., along directions parallel to the centerlines 126). The Fresnel lens 111 can be configured such that light 866 emitted from the light source 130 normal to an emission surface of the light source is redirected by the Fresnel lens in a substantially same redirected direction (y-direction).

As described further elsewhere herein, the optical systems 100, 200, 300 can include at least one reflection mitigation element. The at least one reflection mitigation element may be configured to reduce specular reflection and may be substantially coextensive with the optical film. The at least one reflection mitigation element may include one or more of a structured (e.g., microstructured) surface or interface, an optically diffusive layer (e.g., a volume diffuser which may include beads dispersed in a binder), or an anti-reflection coating. At least one of (i) the optical film or (ii) at least 10 one layer disposed between the optical film and the light control film can include the at least one reflection mitigation element. For example, the optical film 110 can include at least one reflection mitigation element and/or a layer disposed on the light control film 120 on a side of the light control film 120 facing the optical film 110 can include at least one reflection mitigation element. In some embodiments, the at least one reflection mitigation element comprises a plurality of reflection mitigation elements where the optical film includes at least a first one of the reflection mitigation elements and at least one layer disposed between the optical film and the light control film includes at least a different second one of the reflection mitigation elements. Useful microstructures for any microstructured surface or interface of a reflection mitigation element include random diffusive microstructures, engineered pseudo-random (appearing random but being made using a 20 deterministic process) diffusive microstructures, and microstructures arranged in a repeating pattern (e.g., quarter-wave/interference and/or anti-reflective microstructures), for example.

A microstructured surface generally includes microstructures (e.g., the Fresnel elements 115 can be microstructures) where microstructures are structures having at least two orthogonal dimensions, such as a width and a height, less than 1 mm and greater than 100 nm). Microstructures can be formed in a polymeric layer. A polymeric layer is a layer including a continuous phase of organic polymer. A polymeric layer can also include inorganic nanoparticles dispersed in the continuous phase of organic polymer, for example. A polymeric microstructured layer can be formed on a substrate using a cast and cure process, as is known in the art (see, e.g., U.S. Pat. Appl. Pub. No. 2006/0114569 (Capaldo et al.) and U.S. Pat. No. 5,175,030 (Lu et al.) and U.S. Pat. No. 5,183,597 (Lu)). Other methods for making the polymeric structured layer include extrusion, machining, and embossing. Any suitable materials can be used. For example, an acrylate (e.g., polymethylmethacrylate) can be cast and cured onto a polyester (e.g., polyethylene terephthalate) substrate. An acrylate may incorporate monomers that contain nitrogen or bromine, for example, to increase its refractive index. In some embodiments, high index nanoparticles can be included to increase the refractive index.

The light control film 120 can be any suitable light control film including those described in U.S. Pat. No. 8,213,082 (Gaides et al.); U.S. Pat. No. 9,335,449 (Gaides et al.); and U.S. Pat. No. 9,063,284 (Jones et al.), for example, and those described in International Pat. Appl. Pub. Nos. WO 2019/118685 (Schmidt et al.); and WO 2020/026139 (Schmidt et al.), for example.

In some embodiments (e.g., as illustrated for optical system 100), the light source 130 is or includes an organic light emitting diode (OLED) display 132 curved about the first axis. The display 132 can alternatively be another type of emissive display such as a micro-light emitting diode (microLED) display. In some embodiments (e.g., as illustrated for optical systems 200, 300), the light source 130 includes a backlight 134. In some embodiments, the backlight 134 includes a lightguide 136 curved about the first axis. In some embodiments, the light source 130 further includes one or more light emitting elements 135 (e.g., light emitting diode(s)). The backlight 134 can be a direct lit backlight or an edge lit backlight, for example. In some embodiments (e.g., as illustrated for optical system 200), the optical system can include a display panel 139 disposed between the backlight 134 and the light control film 120. In some embodiments (e.g., as illustrated for optical system 300), the optical system can include a display panel 139 where the optical film 110 is disposed between the display panel 139 and the light control film 120.

In some embodiments, an airgap 178 separates at least a majority of the first major surface 112 of the optical film 110 from the light control film 120. An airgap can be provided by not bonding the optical film 110 and the light control film 120 together, by bonding the films together only at one or more edges, or by using elongated spacer members to attach the films together, for example.

Figure 4:
FIGS. 4-6 are schematic cross-sectional views of optical stacks that include an optical film and a light control film, according to some embodiments.
Figure 4:
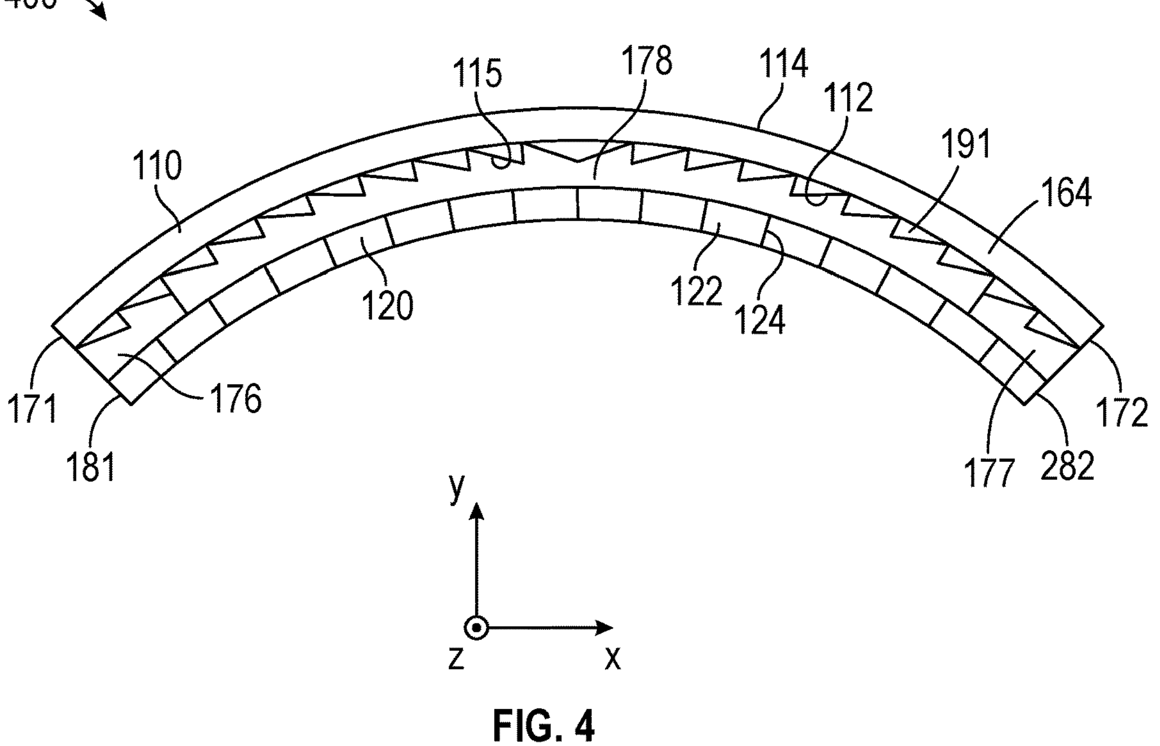

FIG. 4 is a schematic cross-sectional view of an optical system, or a portion of an optical system, including an optical stack 400 that includes the optical film 110 and the light control film 120. In some embodiments, the optical film 110 and the light control film 120 are taped (e.g., with tape 176 or 177) to one another along at least an edge 171 or 172 of the optical film 110 and corresponding edge 181 or 282, respectively, of the light control film. In some embodiments, the optical film 110 and the light control film 120 are taped to one another along at least two edges 171 and 172 of the optical film 110 and corresponding edges 181 and 282, respectively, of the light control film 120. Taped together along an edge should be understood to include tape being applied proximate the edge along at least a portion (e.g., at least a majority) of a length of the edge. One or more reflection mitigation elements may be disposed on the major surface of the light control film 120 facing the optical film 110 as described further elsewhere herein. For example, a structured layer (sec, e.g., FIG. 25) and/or an anti-reflection coating (e.g., anti-reflection coating 744 schematically illustrated in FIGS. 34-45) may be applied (e.g., coated via vapor deposition) to the major surface of the light control film 120 facing the optical film 110. The optical system in this case may be described as including at least one reflection mitigation element disposed between the optical film 110 and the light control film 120.

Figure 5:
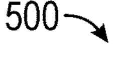
Figure 5:
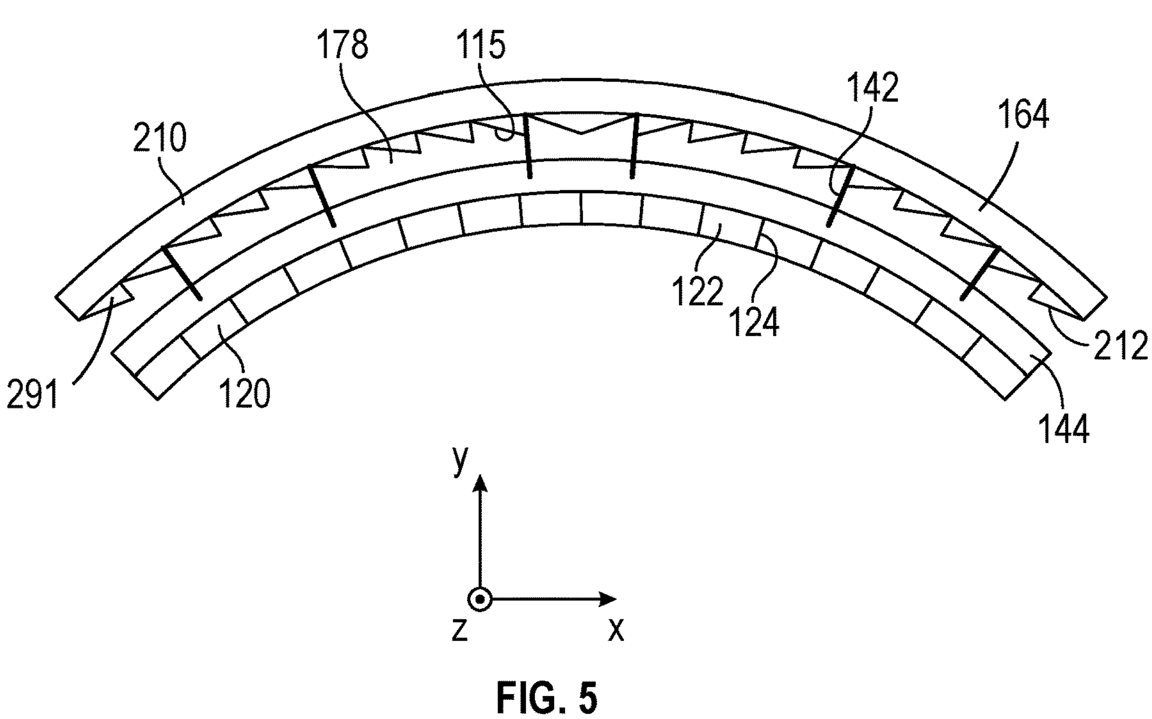
Figure 26:
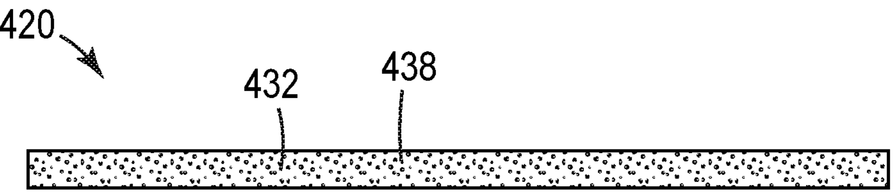
FIG. 26 is a schematic cross-sectional view of an optically diffusive layer, according to some embodiments.

FIG. 5 is a schematic cross-sectional view of an optical system, or a portion of an optical system, including an optical stack 500 that includes an optical film 210 and the light control film 120. The optical film 210 may correspond to optical film 110 except that the first major surface 212 of the optical film 210 includes a plurality of elongated spacer members 142. In some embodiments, the first major surface 212 of the optical film 210 includes a plurality of elongated spacer members 142 extending toward the light control film 120 and being received by an adhesive layer 144 disposed on the light control film 120. The elongated spacer members 142 may be formed with the Fresnel elements 115 or may be deposited after the Fresnel elements 115 have been formed. The elongated spacer members 142 may also be referred to as optical decoupling structures and can have any of the geometries of the optical decoupling structures described in International Appl. Pub. No. WO 2019/135190 (Pham et al.), for example. The layer 144 may include one or more reflection mitigation elements as described further elsewhere herein (e.g., the layer 144 may include beads dispersed in a binder as schematically illustrated in FIG. 26, for example). In this case, the optical system of FIG. 5 may be described as including at least one reflection mitigation element (layer 144) disposed between the optical film 110 and the light control film 120.

Figures 6, 7:
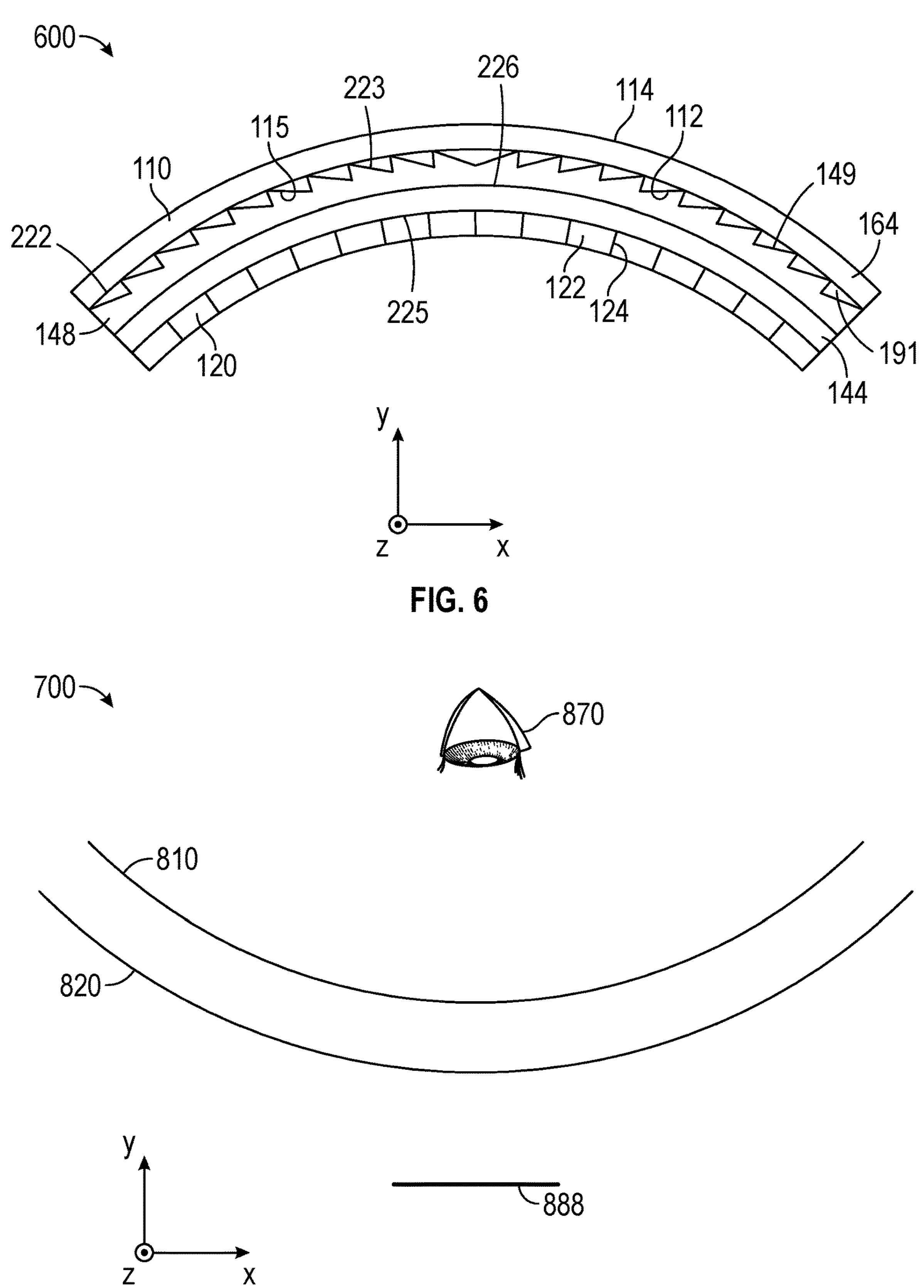
FIGS. 7-8 are schematic cross-sectional views of optical systems schematically illustrating shapes of optical films and light control films, according to some embodiments.

FIG. 6 is a schematic cross-sectional view of an optical system, or a portion of an optical system, including an optical stack 600 that includes the optical film 110 and the light control film 120. In some embodiments, the optical film 110 includes a first layer 191 disposed on a substrate 164 where the first layer 191 includes the microstructured first major surface 112. The optical system or optical stack 600 further includes a second layer 148 (e.g., a low index layer) disposed on and contacting at least a majority of the first major surface 112 of the optical film 110, and an optional third layer 144 (e.g., an optical adhesive) disposed between the second layer 148 and the light control film 120. The third layer 144 can be an optical adhesive bonding the second layer 148 to the light control film 120. The major surface 149 of the second layer 148 facing the first major surface 112 may substantially conform (e.g., nominally conform or conform up to variations small (e.g., less than about 20%, or less than about 10%, or less than about 5%) compared to a height H of the Fresnel elements 115) to the first major surface 112. The major surface of the second layer 149 opposite the major surface 149 may be substantially unstructured or have a structure substantially different that that of the major surface 149. In some embodiments, the third layer includes a structured layer bonded to the light control film, and where the second layer includes an adhesive bonded to the first major surface of the first layer and to a structured major surface of the structured layer. The second layer may have a lower refractive index than the first layer for at least one wavelength in a range of about 400 nm to about 700 nm. The second layer 148 may be considered to be a layer of the optical film 110. In this case, the third layer 144 may also be considered to be a layer of the optical film 110. Alternatively, the second layer 148 and the third layer 144 may be considered to be disposed between the optical film 110 (including layers 191 and 164) and the light control film 120. In some embodiments, the second layer 148 has a refractive index for at least one wavelength (e.g., at least one of about 532 nm, about 550 nm, or about 633 nm) in a range of about 400 nm to about 700 nm of no more than 1.45, or no more than 1.43, or no more than 1.42, or no more than 1.41, or no more than 1.4, or no more than 1.35, or no more than 1.25, or no more than 1.2. For example, the refractive index of the low index layer 148 may be in a range of 1.05 to 1.45, or in a range of 1.1 to 1.35, or in a range of 1.1 to 1.25, or in a range of 1.05 to 1.2, or in a range of 1.35 to 1.43, or in a range of 1.35 to 1.42, for example. The low index layer 148 can be a nanovoided polymeric layer as described in U.S. Pat. No. 8,808,811 (Kolb et al.), for example. Generally, the refractive index of a nanovoided polymeric layer can be adjusted by suitably selecting the volume of nanovoids (voids having at least two orthogonal dimensions less than a micrometer) included in the layer. In some embodiments, the low index layer 148 is a methyl silicone. In some embodiments, the low index layer 148 is an adhesive (e.g., a silicone adhesive) and the adhesive layer 144 is omitted. A METRICON Model 2010 prism coupler (METRICON Corporation Inc. Pennington, N.J.), for example, can be used to measure the refractive index. The refractive index can be determined according to the ASTM D542-14 test standard, for example.

The optical film 110, or the first layer 191 of the optical film 110 including the Fresnel elements 115, or the Fresnel elements 115, can have a refractive index greater than 1.5, or greater than 1.6, or greater than 1.7, for example, for at least one wavelength (e.g., at least one of about 532 nm, about 550 nm, or about 633 nm) in a range of about 400 nm to about 700 nm. The refractive index can be up to about 1.9, for example. In some embodiments, a refractive index of the first layer 191 at about 420 nm is greater than a refractive index of the first layer 191 at about 680 nm by at least about 0.008, or at least about 0.01, or at least about 0.012, or at least about 0.014, or at least about 0.016, and in some embodiments, up to about 0.05, or up to about 0.04, or up to about 0.03, for example.

Any of the layers 164, 191, of 148 may include reflection mitigation elements (e.g., beads or particles in a binder) as described further elsewhere herein. The third layer 144 may also or alternatively include reflection mitigation elements (e.g., when the third layer 144 has a refractive index closer to that of the second layer 148 than to that of the light control film 120). The second major surface 114 of the optical film 110, and/or the interface 222 between the first layer 191 and the substrate 164, and/or the interface 223 between the first layer 191 and the second layer 148, and/or the interface 226 between the second layer 148 and the third layer 144 may include reflection mitigation elements (e.g., a structured surface or interface or an anti-reflection coating) as described further elsewhere herein. Alternatively, or in addition, the interface 225 between the third layer 144 and the light control film 120 may be structured or include an anti-reflection coating (e.g., when the third layer 144 has a refractive index closer to that of the second layer 148 than to that of the light control film 120). The at least one reflection mitigation element can be substantially coextensive with the optical film 110. For example, a reflection mitigation element can be or include a plurality of beads substantially uniformly dispersed in a layer that is substantially coextensive with the optical film. In this case, the plurality of beads can be described as being substantially coextensive with the optical film.

In some embodiments, the optical film 110 and the light control film 120 are substantially concentric. For example, the optical film 110 can the light control film 120 can have substantially similar shapes and can be substantially coextensive with one another.

Figure 8:
Figure 8:
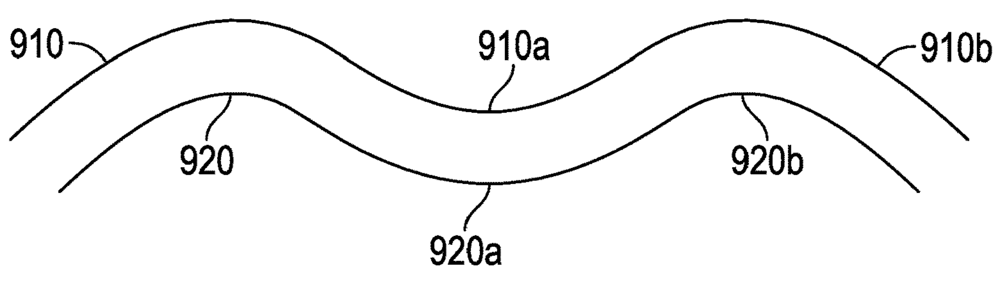
Figure 8:

In some embodiments, the optical system (e.g., 100, 200, or 300) is adapted to display an image 888 to a viewer 870 (see, e.g., FIG. 1), where in the cross-section orthogonal to the first axis, the optical film 110 and the light control film 120 are each convex toward the viewer 870. The optical film 110 and light control film 120 can alternatively have different shapes as schematically illustrated in FIGS. 7-8. FIG. 7 is a schematic cross-sectional view of an optical system 700 include an optical film 810 (e.g., corresponding to optical film 110) and a light control film 820 (e.g., corresponding to light control film 120) and being adapted to display an image 888 to a viewer 870, where in the cross-section orthogonal to the first axis (z-axis), the optical film 810 and the light control film 820 are each concave toward the viewer 870. FIG. 8 is a schematic cross-sectional view of an optical system 800 including an optical film 910 (e.g., corresponding to optical film 110) and a light control film 920 (e.g., corresponding to light control film 120) and being adapted to display an image 888 to a viewer 870, where in the cross-section orthogonal to the first axis, a first portion (910*a* and 920*a*, respectively) of the each of the optical film 910 and the light control film 920 is concave toward the viewer 870 and a second portion (910*b* and 920*b*, respectively) of each of the optical film 910 and the light control film 920 is convex toward the viewer 870.

Figure 9:
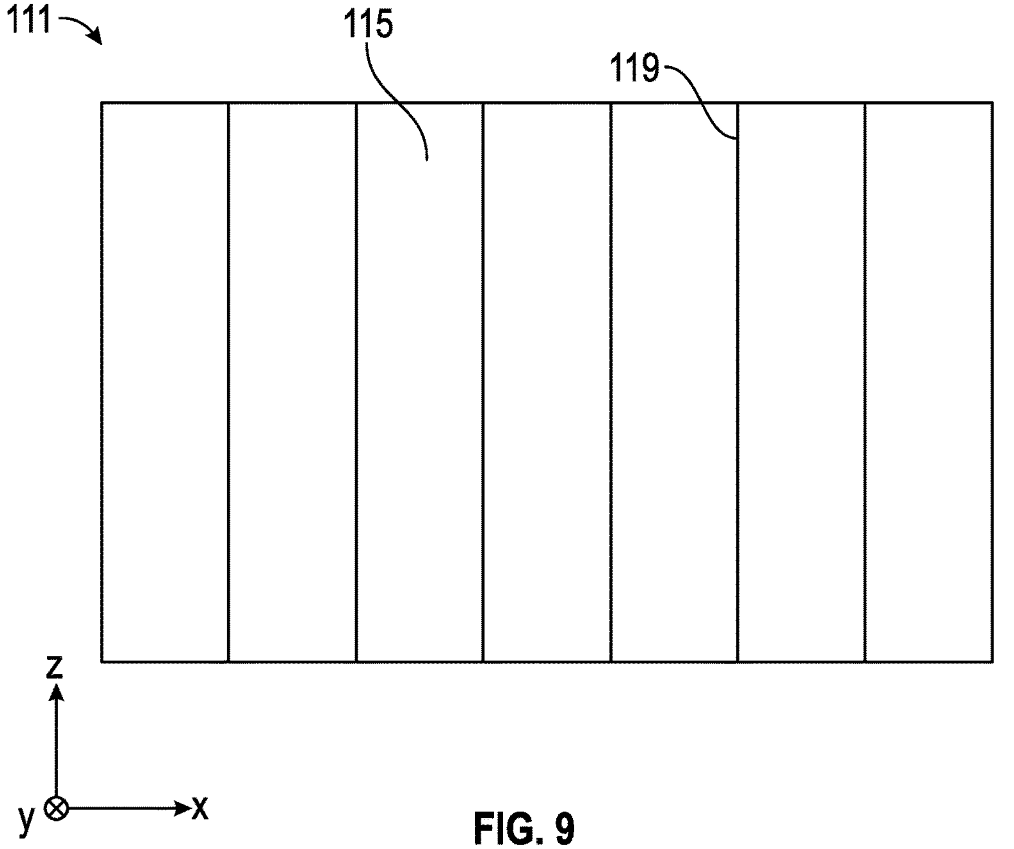
FIG. 9 is a schematic top view of a linear Fresnel lens, according to some embodiments.
Figure 10:
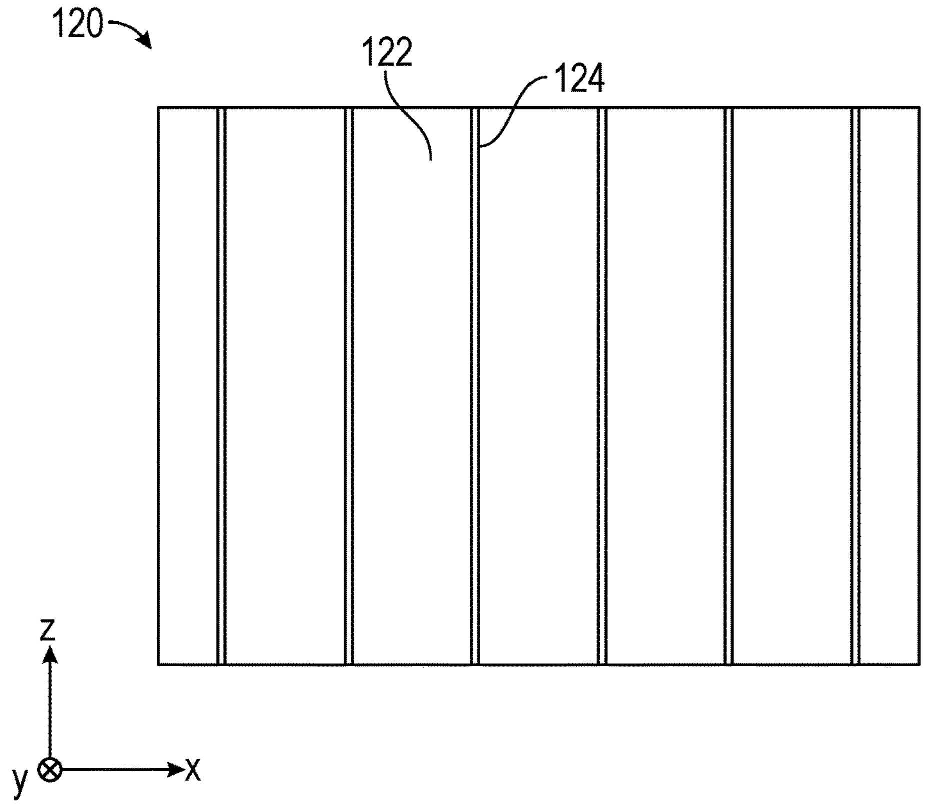
FIG. 10 is a schematic top view of a light control film, according to some embodiments.

In the embodiments schematically illustrated in FIGS. 1-10, the Fresnel elements of the optical film and/or the optically transmissive and absorptive regions of the light control film can extend along the first axis (z-axis). In some embodiments, the first major surface 112 of the optical film 110 defines a linear Fresnel lens 111 including Fresnel elements 115 extending longitudinally along the first axis (z-axis). FIG. 9 is a schematic top view (view facing the first major surface 112) of the linear Fresnel lens 111 when the optical film 110 is laid flat, according to some embodiments. FIG. 10 is a schematic top view of the light control film 120 when the light control film 120 is laid flat, according to some embodiments. In some embodiments, the light control film 120 includes a plurality of alternating optically transmissive regions 122 and optically absorptive regions 124 extending longitudinally along the first axis (z-axis).

In some embodiments, each Fresnel element 115 of optical film 110 includes an optical facet 117 and a sidewall 118 meeting the optical facet 117 at a ridge 119 of the Fresnel element. In some embodiments, each Fresnel element in at least a majority of the Fresnel elements 115 includes one or more of an at least partial coating (e.g., a conformal coating) of an inorganic optically transparent layer, an optically absorptive layer, a first layer disposed between and optically absorptive layer and the sidewall where the first layer can be less optically absorptive than the optically absorptive layer, and a second layer disposed on the optically absorptive layer opposite the sidewall where the second layer can be less optically absorptive than the optically absorptive layer and can be one or more of a protective layer or an antireflection layer.

Figure 11:
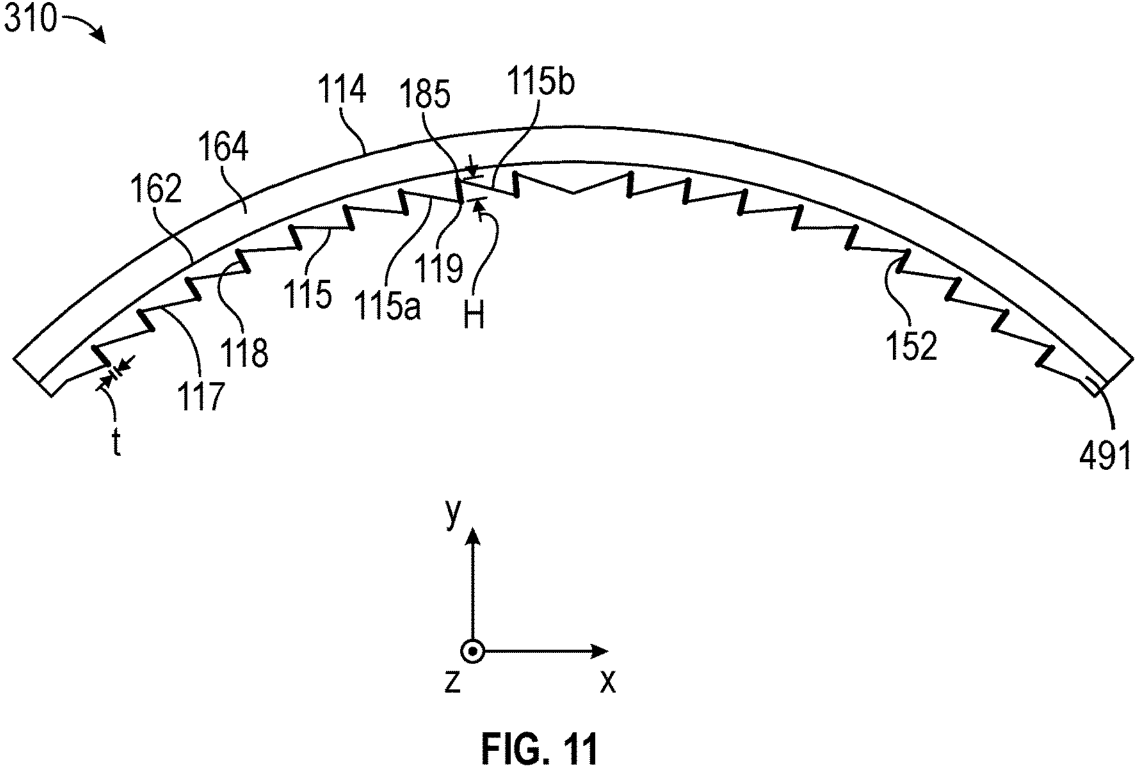
FIG. 11 is a schematic cross-sectional view of an optical film including a plurality of Fresnel elements, according to some embodiments.

FIG. 11 is a schematic cross-sectional view of an optical film 310 which may correspond to optical film 110. The optical film 310 includes a first layer 491 disposed on a substrate 164. In some embodiments, each Fresnel element

115 includes an optical facet 117 and a sidewall 118 meeting the optical facet 117 at a ridge 119 of the Fresnel element. In some embodiments, for each Fresnel element in at least a majority of the Fresnel elements, an optically absorptive layer 152 is disposed on and substantially covers the sidewall 118. In some embodiments, the plurality of Fresnel elements includes a plurality of polymeric Fresnel elements 334 at least partially coated (e.g., conformally coated) with an inorganic optically transparent layer 157 (see, e.g., FIG. 13). In some embodiments, for each Fresnel element in at least a majority of the Fresnel elements, an optically absorptive layer 152 is disposed on and substantially covers the inorganic optically transparent layer 157 disposed on the sidewall 118.

As described further elsewhere herein, the inorganic optically transparent layer can be used as an etch stop in processes for removing the optically absorptive layer and/or other layers from the optical facets. Suitable materials for the inorganic optically transparent layer include a-Si, SiOx, SiAlOx, SiCyOx, $TiO_2$, and AlOx, for example. The layer can be sufficiently thin that greater than 60%, for example, of normally incident visible light is transmitted through the layer. A layer can be considered optically transparent if the layer has an average optical transmittance (unweighted mean over wavelength for unpolarized light) of visible light (wavelengths in a range of about 400 nm to about 700 nm) normally incident on the layer in air that is at least 60%. In some embodiments, the average optical transmittance of an inorganic optically transparent layer is greater than 60%, or greater than 70%, or greater than 80%, or greater than 85%, or greater than 90%.

In some embodiments, the optically absorptive layer 152 has an average thickness t where 100 nm<t<2 micrometers or 100 nm<t<1 micrometer. In some embodiments, the average thickness t is less than 500 nm. In some embodiments, for each Fresnel element 115*a* in at least the majority of the Fresnel elements 115, the sidewall 118 of the Fresnel element 115*a* has a height H from a base 185 of an adjacent Fresnel element 115*b* to the ridge 119 of the Fresnel element 115*a*, where H/t>10, or H/t>15, or H/t>18, or H/t>20.

In some embodiments (e.g., of optical film 110, 210, or 310), for each Fresnel element in at least the majority of the Fresnel elements, the sidewall 118 of the Fresnel element is substantially normal (e.g., within 30 degrees, or within 20 degrees, or within 10 degrees, or within 5 degrees of normal) to the second major surface 114. In some embodiments, the optical film 110, 210, or 310 includes a substrate 164 where the plurality of Fresnel elements 115 is formed on a major surface 162 of the substrate 164. In some embodiments, for each Fresnel element in at least the majority of the Fresnel elements, the sidewall 118 of the Fresnel element is substantially normal to the major surface 162 of the substrate 164. In some embodiments, the sidewall 118 makes an angle with the major surface 162 or with the major surface 114 or with a base of the Fresnel element in a range of 85 to 90 degrees or in other ranges described elsewhere herein.

Figure 12:
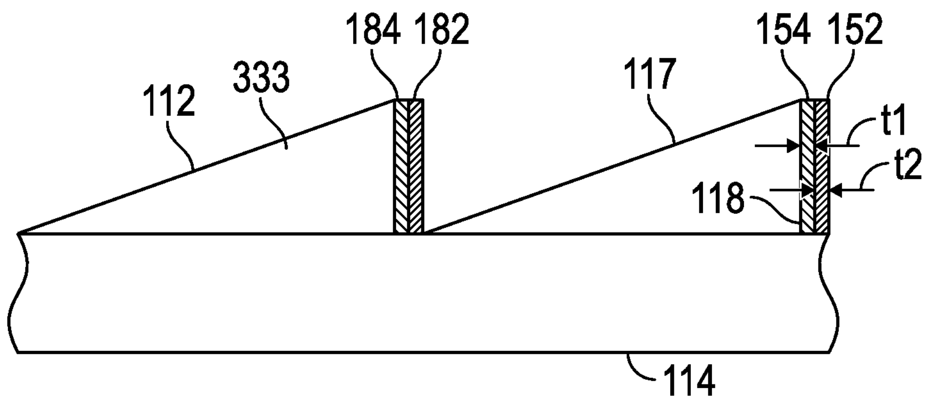
FIGS. 12-17 are schematic cross-sectional views of portions of optical films including a plurality of Fresnel elements, according to some embodiments.

FIG. 12 is a schematic cross-sectional view of a portion of an optical film (e.g., corresponding to optical film 110, 210, or 310). In some embodiments, for each Fresnel element 115 in at least the majority of the Fresnel elements, a first layer 154 is disposed between the sidewall 118 and the optically absorptive layer 152. The first layer 154, which may be referred to as a cladding layer, can be included to reduce reflection of light at an interface between the sidewall and the optically absorptive layer 152. In some embodiments, the first layer 154 has an extinction coefficient k1 and the optically absorptive layer 152 has an extinction coefficient k2. In some embodiments, k2>k1. In some embodiments, the plurality of Fresnel elements has an extinction coefficient k0<0.05. In some embodiments, k2>k1>k0. The extinction coefficient k0 can be understood to be the extinction coefficient of the material at the first major surface 112 defining the Fresnel element. In some embodiments, k2-k1 is greater than 0.05, 0.1, 0.15, or 0.2. In some embodiments, k2−k1 is less than 1, or less than 0.8, or less than 0.5 In some embodiments, k1−k0 is greater than 0.001, 0.005, or 0.01. In some embodiments, k1−k0 is less than 0.15, or less than 0.1, or less than 0.05. In some embodiments, k0 is less than 0.01, or less than 0.005, or less than 0.002. In some embodiments, k1 is in a range of 0.005 to 0.15, or 0.01 to 0.1. In some embodiments, k2 is in a range of 0.1 to 0.5, or 0.2 to 0.4. In some embodiments, k1<0.5 k2. In some embodiments, 0.005<k1<0.5 k2. Instead of, or in addition to, describing the first layer 154 and the optically absorptive layer 152 in terms of extinction coefficient, the layers can be described in terms of concentration of optically absorptive material as described further elsewhere herein.

In some embodiments, the optically absorptive layer 152 has a refractive index n1 and the first layer 154 has a refractive index n2, where $|n1-n2|$ is less than 0.5, or less than 0.3, or less than 0.2, or less than 0.1.

The extinction coefficient can be expressed as the imaginary part of a complex index of refraction and the refractive index can be expressed as the real part of the complex index of refraction. The extinction coefficient and refractive index can be understood to be evaluated at a wavelength of 550 nm when another wavelength is not indicated.

The extinction coefficient, k, of a thin film coating, for example, can be determined via either ellipsometry or spectroscopy, for example, k can be expressed as $\alpha\lambda/(4\pi)$ where $\alpha$ is the absorption coefficient and $\lambda$ is the wavelength. For a thin film coating on a transparent substrate, spectroscopy can be used to measure the absorptance A as 100%−T−R, where T is transmittance and R is reflectance. The measured A can be appropriately corrected for the A of the substrate to obtain A of the thin film itself. The resulting A can then be used to determine $\alpha$ according to the equation $\alpha=-\ln[(100\%-A)/100\%]/h$ where h is the thickness of the thin film coating; this equation for $\alpha$ is an approximation used when R is relatively small, and A is relatively large. The thickness h can be measured, for example, by stylus profilometry or cross-sectional scanning electron microscopy.

The light absorbing material for the optically absorptive layer 152 and/or for the first layer 154 can be one or more of dyes, pigments, or particles (e.g., nanoparticles). Suitable light absorbing materials include carbon black nano-pigments and other nano-pigments such as those available from Cabot Corporation (Boston, MA) under the CAB-O-JET tradename. Other suitable light absorbing materials include those described in International Pat. Appl. Pub. No. WO 2019/118685 (Schmidt et al.).

In some embodiments, the first layer 154 has a concentration C1 of light absorbing material 184 and the optically absorptive layer 152 has a concentration C2 of light absorbing material 182, where C2>C1. In some embodiments, C1<0.7C2, or C1<0.5C2.

The concentration of light absorbing material (e.g., light absorbing nanoparticles) in the optically absorptive layer can be at least 10, 15, 20, 25, 30, 35, 40, 45, or 50 wt. % of the optically absorptive layer. In some embodiments, the concentration of light absorbing material in the optically absorptive layer is at least 55, 60, 65, 70, 75, 80, 85, 90 or 95 wt. % of the optically absorptive layer. In some embodiments, the concentration of light absorbing material in the optically absorptive layer is 100 wt. %. In some embodiments, the concentration of light absorbing material in the optically absorptive layer is 30-100 wt. % or 75-90 wt. % of the optically absorptive layer.

The concentration of light absorbing material in the first layer (cladding layer) is preferably less than the concentration of light absorbing material in the optically absorptive layer. The concentration of light absorbing material in the first layer is typically at least 0.5, 1, 5, 10, 15, 20, 25, 30, 35, 40 or 45 wt. % of the first layer. In some embodiments the concentration of light absorbing material in the first layer is no more than 20, 25, 30, 35, 40, 45, 50, 55, 60, 70, or 75 wt. % of the first layer. In some embodiments, the concentration of light absorbing material in the first layer is 0.5-50 wt. % or 25-45 wt. % of the first layer.

In some embodiments, the light control film 120 is as generally described in International Pat. Appl. Pub. No. WO 2019/118685 (Schmidt et al.), for example. In some such embodiments, the optically absorptive layer of the louvers includes an optically absorptive core layer and cladding layers on each side of the optically absorptive core layer. The optically absorptive core layer can be as described for the optically absorptive layer 152 and the cladding layers can be as described for the first layer 154. Using cladding layers can reduce the reflectivity of the louvers thereby reducing high angle light leakage and ghosting. Light control films including core and cladding layers are described in International Pat. Appl. No. IB2019/056489 (Schmidt et al.).

Figure 13:
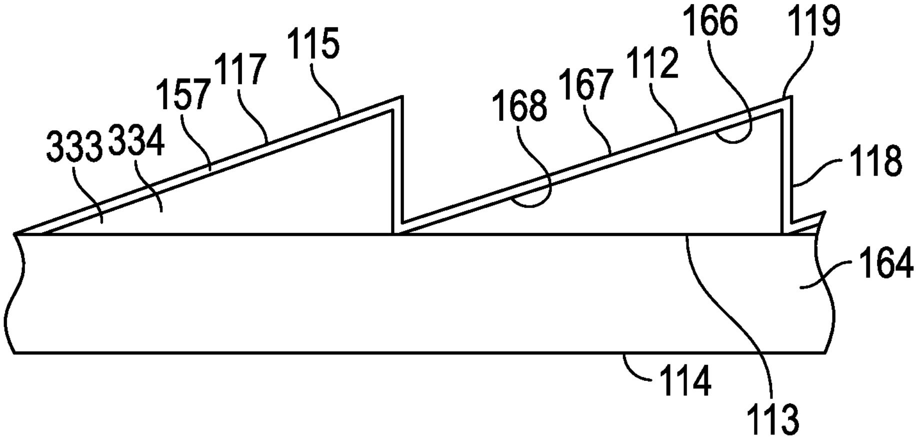
Figure 14:
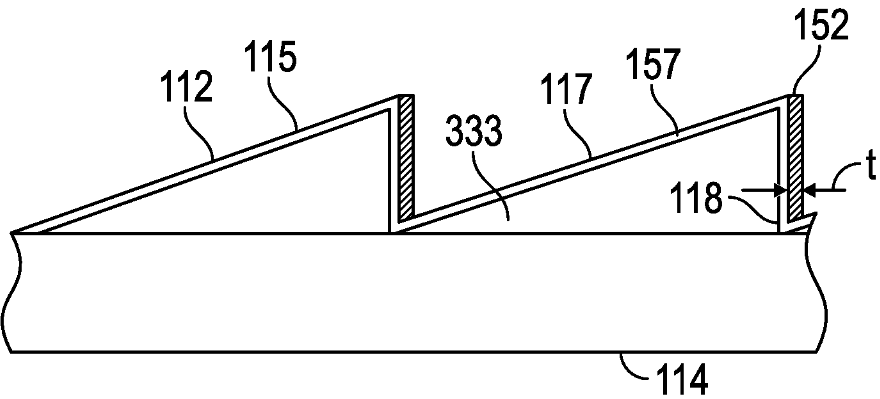
Figure 15:
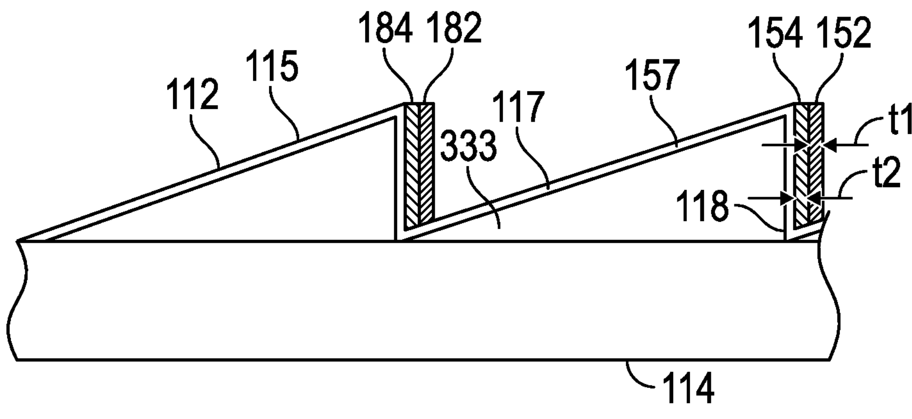
Figure 16:
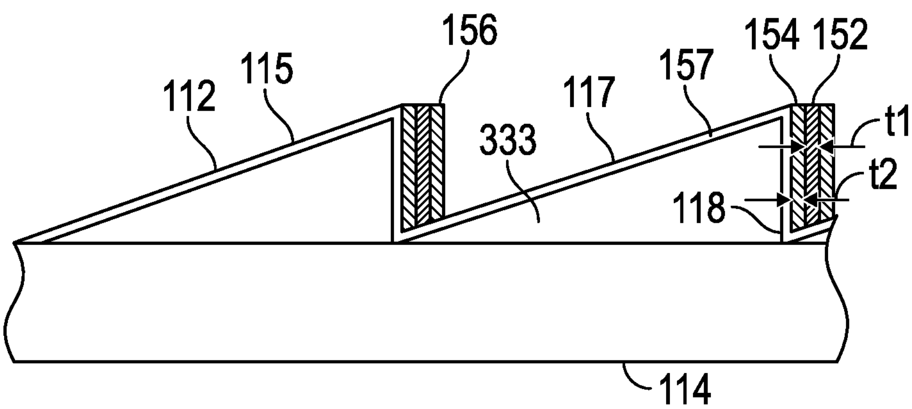

FIGS. 13-17 are schematic cross-sectional views of portions of an optical film (e.g., corresponding to optical film 110, 210, or 310). In some embodiments, as schematically illustrated in FIG. 13, for example, the plurality of Fresnel elements 115 includes a microstructured polymeric layer 333 conformally coated with an inorganic optically transparent layer 157. The inorganic optically transparent layer 157 can include opposing first 167 and second 166 major surfaces where the second major surface 166 faces the polymeric layer 333. The polymeric layer 333 has a major surface 113 facing the substrate layer 164. In some embodiments, as schematically illustrated in FIG. 14, for example, for each Fresnel element in at least a majority of the Fresnel elements 115, an optically absorptive layer 152 is disposed on and substantially covers the inorganic optically transparent layer 157 disposed on the sidewall 118. In some embodiments, as schematically illustrated in FIG. 15, for example, for each Fresnel element in at least the majority of the Fresnel elements 115, a first layer 154 is disposed between the sidewall 118 and the optically absorptive layer 152. In some embodiments, as schematically illustrated in FIG. 14, for example, the first layer 154 is omitted. In some embodiments, as schematically illustrated in FIG. 16, for example, for each Fresnel element in at least the majority of the Fresnel elements 115, a second layer 156 is disposed on the optically absorptive layer 152 opposite the sidewall 118 or opposite the first layer 154. The second layer 156 can be a protective layer and/or and antireflective layer, for example. The second layer can be as generally described for the first layer 154 (e.g., having an average thickness and/or extinction coefficient and/or concentration of optically absorptive material in the ranges described for the first layer 154). The inorganic optically transparent layer 157 may be optionally be omitted.

Figure 17:
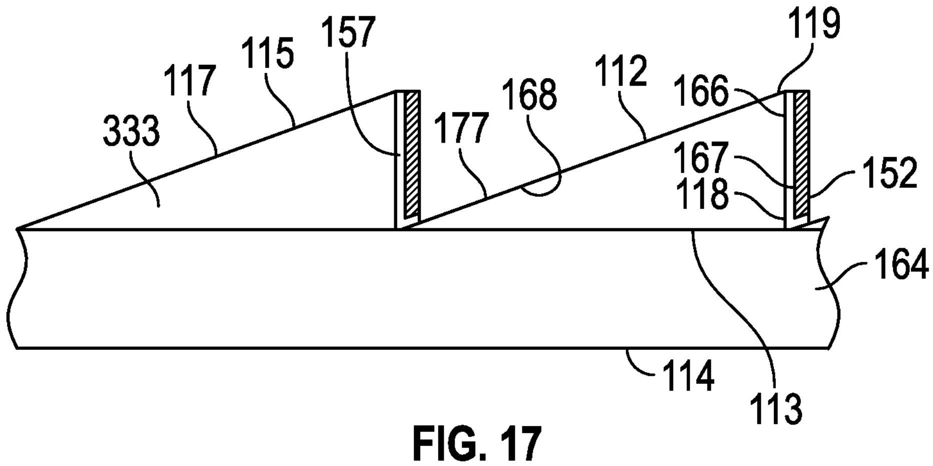

In some embodiments, as schematically illustrated in FIG. 17, for example, the microstructured surface 168 is only partially coated with the inorganic optically transparent layer 157 (e.g., only on the sidewalls). For example, the inorganically optically transparent layer can be conformally coated onto the microstructured surface 168 and then subsequently removed (or at least partially removed) from the optical facets. In any of the embodiments illustrated in FIGS. 13-16, the inorganic optically transparent layer 157 can optionally be removed or partially removed (e.g., a thin layer can remain) from the optical facets, for example. In some embodiments, the first major surface 112 of the optical film can include a major surface of the inorganic optically transparent layer 157 (e.g., the surfaces 167 of the plurality of sidewalls 118). In some embodiments, the Fresnel elements 115 of the at least partially coated microstructured surface can include optical facets that are a portion of the microstructured surface 168 of the polymeric layer 333 and can include sidewalls that are a portion of a major surface of the inorganic optically transparent layer 157. Alternatively, the Fresnel elements 115 can be considered to include optical facets and sidewalls that are portions of the microstructured surface 168 of the polymeric layer 333 and the inorganic optically transparent layer 157 can be considered to be a coating on the sidewall of the polymeric microstructure.

In some embodiments, an optical film includes a polymeric layer 333 including a microstructured surface 168 at least partially coated with an inorganic optically transparent layer 157. The at least partially coated microstructured surface 177 (which can include the optical facets 117 and the surface 167 of the inorganic optically transparent layer 157 on the sidewalls) includes a plurality of Fresnel elements 115. Each Fresnel element 115 includes an optical facet 117 and a sidewall 118 meeting the optical facet 117 at a ridge 119 of the Fresnel element 115. The optical facet 117 and the sidewall 118 can define an oblique angle therebetween. For each Fresnel element 115 in at least a majority of the Fresnel elements, an optically absorptive layer 152 is disposed on and substantially covers the sidewall 118.

In some embodiments, an optical film includes a polymeric layer 333 including a major surface 168 including a plurality of Fresnel elements. Each Fresnel element includes an optical facet (e.g., 117) and a sidewall (e.g., portion of major surface 168 facing the sidewall portion of the inorganic optically transparent layer 157) meeting the optical facet at a ridge of the Fresnel element. The optical facet and the sidewall can define an oblique angle therebetween. For each Fresnel element in at least a majority of the Fresnel elements: an inorganic optically transparent layer 157 is disposed on and substantially covers the sidewall: and an optically absorptive layer 152 is disposed on the inorganic optically transparent layer 157 opposite the sidewall where the optically absorptive layer 152 substantially covers the inorganic optically transparent layer 157.

In some embodiments, the inorganic optically transparent layer 157 can be provided on the sidewalls along with other layer(s) such as an optically absorptive layer as follows. The inorganically optically transparent layer can be conformally coated onto a microstructured polymeric layer, an optically absorptive layer (and optionally other layers) can be conformally coated onto the inorganic optically transparent layer, the optically absorptive layer (and optionally other layers) can be removed from the optical facets in a first etching step, then the inorganic optically transparent layer can be removed, or partially removed, from the optical facets in a second etching step. The first and second etching steps can utilize different etchants (e.g., an oxygen only plasma for the first etching step and a fluorinated gas or other halogenated gas for the second etching step), for example, in order to remove the desired layer(s) in the corresponding etching step.

In some embodiments, for each Fresnel element in at least the majority of the Fresnel elements 115, the first layer 154 has an average thickness t1, and the optically absorptive layer 152 has an average thickness t2. In some embodiments, t1 and t2 are each greater than 100 nm and less than 2 micrometers or less than 1 micrometer or less than 500 nm. In some embodiments, t1 and t2 are each less than 500 nm. In some embodiments, for each Fresnel element in at least the majority of the Fresnel elements 115, the sidewall 118 of the Fresnel element has a height H from a base of an adjacent Fresnel element to the ridge 119 of the Fresnel element. In some embodiments, H/t1>10, or H/t1>12, or H/t1>15, or H/t1>18, or H/t1>20. In some embodiments, H/t1<100. In some embodiments, H/t2>10, or H/t2>12, or H/t2>15, or H/t2>18, or H/t2>20. In some embodiments, H/t2<100. For example, in some embodiments, H/t1>15 and H/t2>15.

In some embodiments, for each Fresnel element in at least a majority of the Fresnel elements, the optical facet 117 is planar (e.g., as in typical conventional Fresnel lenses). FIG. 18 is a schematic illustration of a Fresnel element with a planar optical facet 217 where the sidewall 218 of the Fresnel element makes an angle q with a base 285 of the Fresnel element. In other embodiments, for each Fresnel element in at least a majority of the Fresnel elements 115, the optical facet 117 is curved. For example, the facets can be curved to adjust various optical properties as described in U.S. Statutory Invention Registration No. H423 (Mohon et al.), for example. The optical facets 117 may be curved as schematically depicted in FIG. 19 for curved optical facet 317 (concave towards the sidewall 218 and/or towards the base 285 and/or towards the major surface 114 (sec, e.g., FIG. 1)) or as schematically depicted in FIG. 20 for curved optical facet 417 (convex towards the sidewall 218 and/or towards the base 285 and/or towards the major surface 114), for example. The angle φ in FIGS. 18-20 may be in a range of 80 degrees to 90 degrees or 85 degrees to 90 degrees, for example. In some embodiments, q is less than 90 degrees (e.g., 85 to 89.5 degrees) due to manufacturing constraints, for example.

FIG. 21 is a schematic illustration of a mean deviation surface roughness Ra of a surface 517 which can be a surface of an optical facet. The mean deviation surface roughness Ra is the mean (e.g., mean over a length in a cross-section through the facet (e.g., in a cross-section orthogonal to a length of the facet) of the absolute value of the deviation of surface height from a mean surface height. In the case of a curved facet, the deviation in surface height can be defined relative to a mean or nominal curved surface. In some embodiments, for each Fresnel element in at least a majority of the Fresnel elements 115, the optical facet 117 has a mean deviation surface roughness Ra<250 nm. In some embodiments, Ra is less than 200 nm, 150 nm, 100 nm, 70 nm, 50 nm, 30 nm, or 20 nm. In some embodiments, Ra is greater than 50 nm, 70 nm, 90 nm. For example, in some embodiments, 50 nm<Ra<200 nm or 70 nm<Ra<200 nm. For some applications, it is desired for the optical facet 117 to be optically smooth (e.g., Ra<50 nm). For other applications, some degree of surface roughness may be desired (e.g., 50 nm<Ra<250 nm or 90 nm<Ra<200 nm). For example, it may be useful to have some degree of surface roughness for antireflection, for providing an (e.g., weak) optical diffusion, and/or for improving bonding. It has been found that using the processes described in International Pat. Appl. No. WO 2019/118685 (Schmidt et al.) to deposit and remove an optically absorptive layer from the sloped facets results in a surface roughness that is higher than desired (e.g., Ra greater than 300 nm or greater than 400 nm) for many applications, even though the same process applied to horizontal facets results in low surface roughness. However, it has been found that the surface roughness (e.g., Ra) can be reduced (e.g., to less than 250 nm or to less than 200 nm) by carefully controlling the time that the optical facet is exposed to plasma in a reactive ion etching process, for example. Further, it has been found that applying an inorganic optically transparent layer as an etch stop prior to applying the optically absorptive layer (and/or other layers) can further reduce the surface roughness and can result in optically smooth optical facets (e.g., Ra<50 nm) even with longer etch times. The root-mean-square surface roughness Rq can also be determined and may be in any of the ranges described for Ra.

In some embodiments, the at least one reflection mitigation element comprises at least one of a structured surface other than the microstructured first major surface, an anti-reflection coating, or a volume diffuser. The structured surface may be an exposed surface (e.g., an outermost major surface exposed to air) or may be a surface at an interface. In addition, the microstructured first major surface may be anti-reflective or diffusive as described further elsewhere herein. A volume diffuser, which may also be referred to as a bulk diffuser, is a diffuser where optical diffusion occurs through scattering within the volume of the diffuser. A surface diffuser is a diffuser where optical diffusion occurs through scattering at a major surface of the diffuser. A volume diffuser may employ surface diffusion in addition to volume diffusion (e.g., a volume diffuser can have a microstructured major surface for additional diffusion). In some embodiments, a volume diffuser includes a plurality of beads dispersed in a binder.

The surface roughness can be determined from surface profiles measured via atomic force microscopy (AFM), stylus profilometry, or optical profilometry, for example. AFM is typically preferred for small surface roughness (e.g., less than 50 nm).

The inorganic optically transparent layer, the first layer (e.g., cladding layer), the optically absorptive layer, and/or the second layer (e.g., protective layer) can be deposited (e.g., as a conformal coating over an entire structured surface) using any suitable deposition technique. Various coating methods that can be used include, for example, layer-by-layer (LbL) coating, chemical vapor deposition (CVD), sputtering, reactive sputtering, and atomic layer deposition (ALD). At least some of the deposited layers (e.g., all of the layers, or all of the layers except the optional inorganic optically transparent layer) can subsequently be substantially removed from the optical facets (e.g., removed at least to the extent that any material from the at least some of the deposited layers remaining on the optical facets does not significantly affect optical performance).

In some embodiments, at least one of the first layer and the optically absorptive layer includes at least two bi-layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. Some examples of suitable processes include those described in U.S. Pat. No. 8,234,998 (Krogman et al.) and U.S. Pat. No. 8,313,798 (Nogueira et al.); in U.S. Pat. Appl. Pub. No. 2011/0064936 (Hammond-Cunningham et al.); and in International Pat. Appl. No. WO 2019/118685 (Schmidt et al.). Layer-by layer dip coating can be conducted using a StratoSequence VI (nanoStrata Inc., Tallahassee, FL) dip coating robot, for example.

In some embodiments, the plurality of bi-layers deposited by layer-by-laver self-assembly is a polyelectrolyte stack including an organic polymeric polyion (e.g., cation) and counterion (e.g., anion) including a light absorbing material (e.g., pigment). At least a portion of the cation layers, anion layers, or a combination thereof can include a light absorbing material (e.g., pigment) ionically bonded to the polyelectrolyte. A light absorbing compound can be dispersed within at least a portion of the polyelectrolyte layers. Various polyelectrolytes can be utilized including inorganic compounds, such as silica or silicate, as well as various phosphonocarboxylic acids and salts thereof (some of which are described in U.S. Pat. No. 10,365,415 (Schmidt)).

The thickness of a bi-layer and the number of bi-layers can be selected to achieve the desired optical properties (e.g., light absorption in the case of the optically absorptive layer, or reduced reflection between the sidewall and the optically absorptive layer in the case of the first layer). In some embodiments, the thickness of a bi-layer and/or the number of bi-layers are selected to achieve the desired optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. It should be appreciated that individual bi-layers in the final article may not be distinguishable from each other by common methods in the art such as scanning electron microscopy (SEM) or transmission electron microscopy (TEM). In some embodiments, the thickness of the bi-layers and the total number of bi-layers are selected such that the total thickness of the first layer and the optically absorptive layer is less than 2 micrometers.

After applying and drying the optically absorptive layer and optionally the first and/or second layers and/or the inorganic optically transparent layer to the (e.g., entire) microstructured surface of the film, the optically absorptive layer and the first and second layer, when present, can then be removed from the optical facets and also removed from the land regions, if any, between adjacent Fresnel elements. The inorganic optically transparent layer, which can function as an etch stop, is typically not removed, but can optionally be removed in a subsequent etching step.

Any suitable method can be used to selectively remove layer(s) from the optical facets. In some embodiments, layer(s) are removed by reactive ion etching. Reactive ion etching (RIE) is a directional etching process utilizing ion bombardment to remove material. RIE systems are used to remove organic or inorganic material by etching surfaces in the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are typically built around a durable vacuum chamber. Before beginning the etching process, the chamber is typically evacuated to a base pressure lower than 1 Torr, 100 mTorr, 20 mTorr, 10 mTorr, or 1 mTorr. Typically, an electrode holds the materials to be treated and is electrically isolated from the vacuum chamber. The electrode may be a rotatable electrode in a cylindrical shape. A counter electrode is typically also provided within the chamber and may include the vacuum reactor walls. Gas including an etchant typically enters the chamber through a control valve. The process pressure can be maintained by continuously evacuating chamber gases through a vacuum pump. The type of gas used varies depending on the etch process. Etchants can include on or more of oxygen, fluorinated gases, or other halogenated gases, for example. Carbon tetrafluoride ($CF_4$), sulfur hexafluoride ($SF_6$), octafluoropropane ($C_3F_8$), perfluorohexane ($C_6F_{14}$), fluoroform ($CHF_3$), boron trichloride ($BCl_3$), hydrogen bromide (HBr), nitrogen trifluoride ($NF_3$), chlorine, argon, and oxygen are commonly used for etching. Radio frequency (RF) power is applied to the electrode to generate a plasma. Reactive ion etching is known in the art and further described in U.S. Pat. No. 8,460,568 (David et al.) and in International Pat. Appl. No. WO 2019/118685 (Schmidt et al.), for example.

Samples can be conveyed on the electrode through plasma for a controlled time period to achieve a specified etch depth or to limit the etch so that the etch does not penetrate below the layer(s) desired to be removed. For example, if it is desired to remove an optically absorptive layer and the inorganic optically transparent layer is not included, the time period can be adjusted to minimize the time that the optical facets may be exposed to the plasma. This can reduce the surface roughness of the optical facets (e.g., such that $Ra<250$ nm) as described elsewhere.

In some embodiments, the optically absorptive layer (and/or other layers) are removed by laser ablation, e.g., pulsed laser ablation. Pulsed laser ablation (PLA) is a directional ablation process utilizing a photon flux to generate enough photon fluence to remove material through oxidation and/or sputtering. PLA systems are used to remove organic or inorganic material by etching surfaces in the direction of the photon fluence which can vaporize the target in the generation of a plasma plume. PLA is dependent on the wavelength of the laser, and the amount of absorption present at that wavelength in the light absorbing material. Absorption of the laser pulse generates energy for thermal, chemical, or mechanical evaporation, ablation, and/or plasma formation. The presence of oxidizing gas in the location of the laser pulse may change the amount of chemical oxidation occurring during the PLA process. The fluence can be changed by the optical configuration to change the size and location of the focal spot and by the power setpoints of laser systems. The relative orientation of the laser fluence and the sample can allow one skilled in the art to ablate optically absorptive layers coated on a structured surface at oblique angles.

Examples of optical films including microstructures that each have an optical facet and a sidewall meeting the optical facet at a ridge of the microstructure where an optically absorptive layer is disposed on the sidewall but not on the optical facet are described in U.S. Appl. No. 62/932,578 filed on Nov. 8, 2019 and titled "OPTICAL FILM", and in International Pat. App. No. PCT/IB2020/060184.

Figure 22:
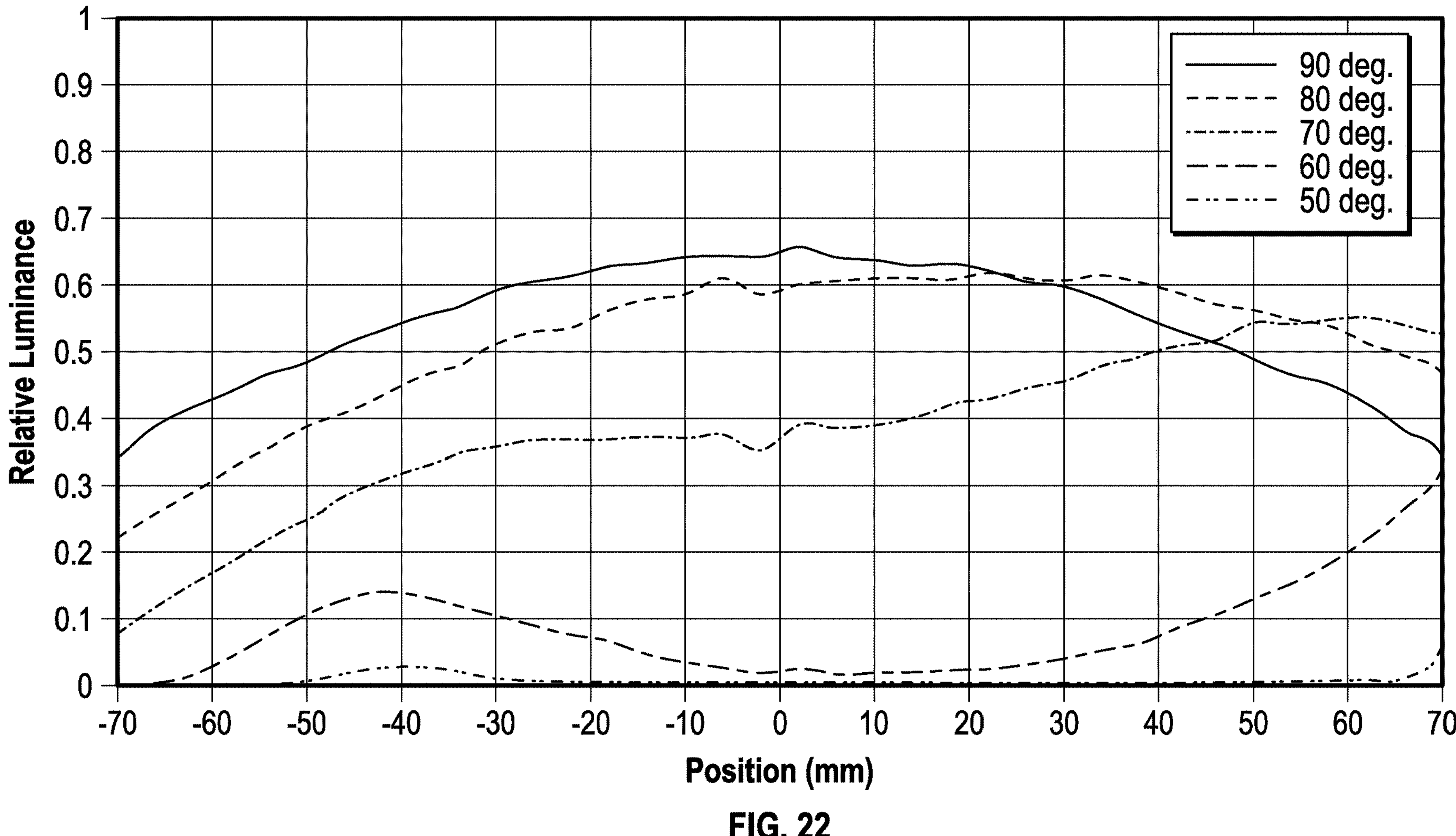
FIGS. 22-24 are plots of relative luminance versus position for various view angles, according to some embodiments.
Figure 23:
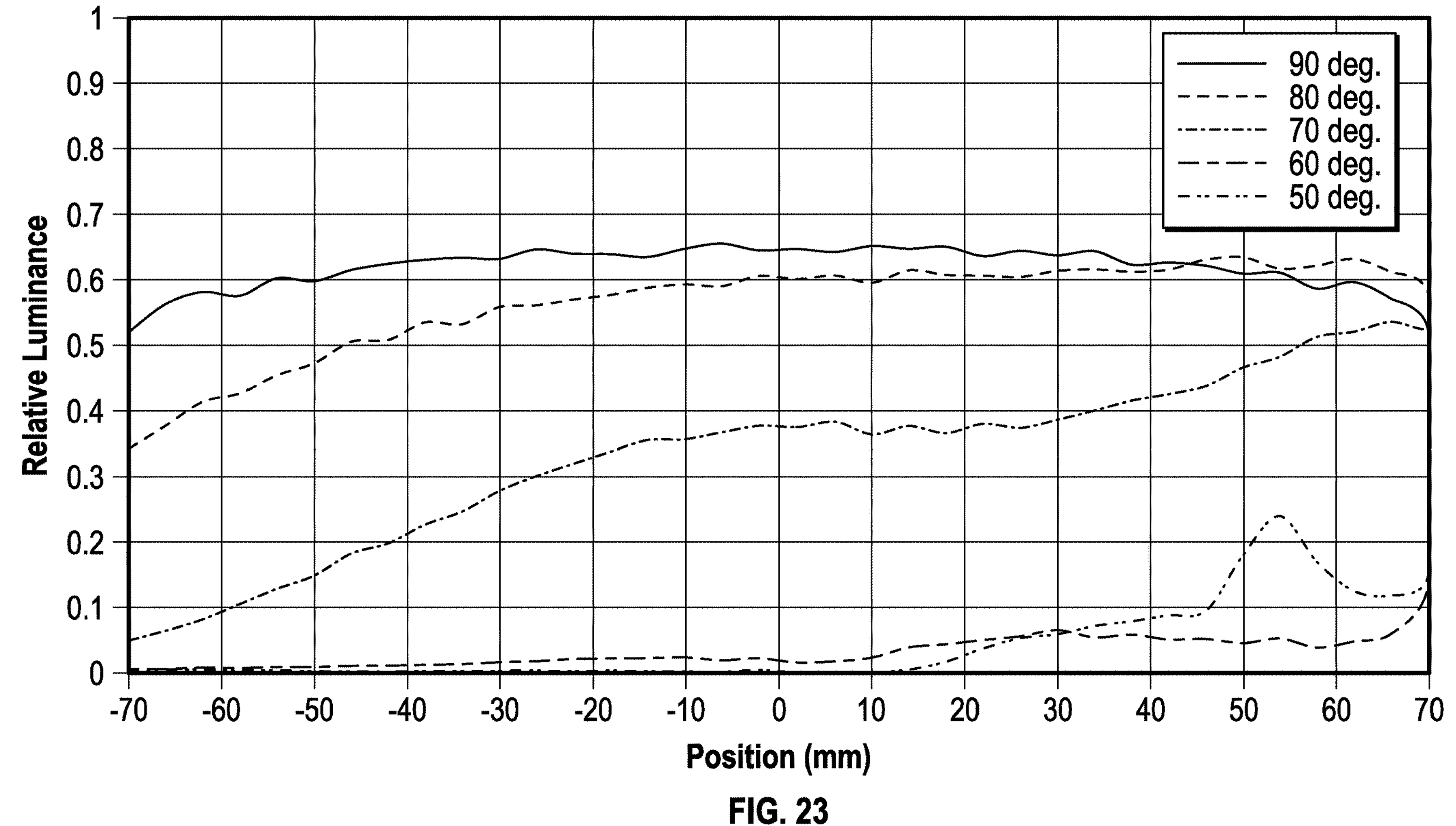
Figure 24:
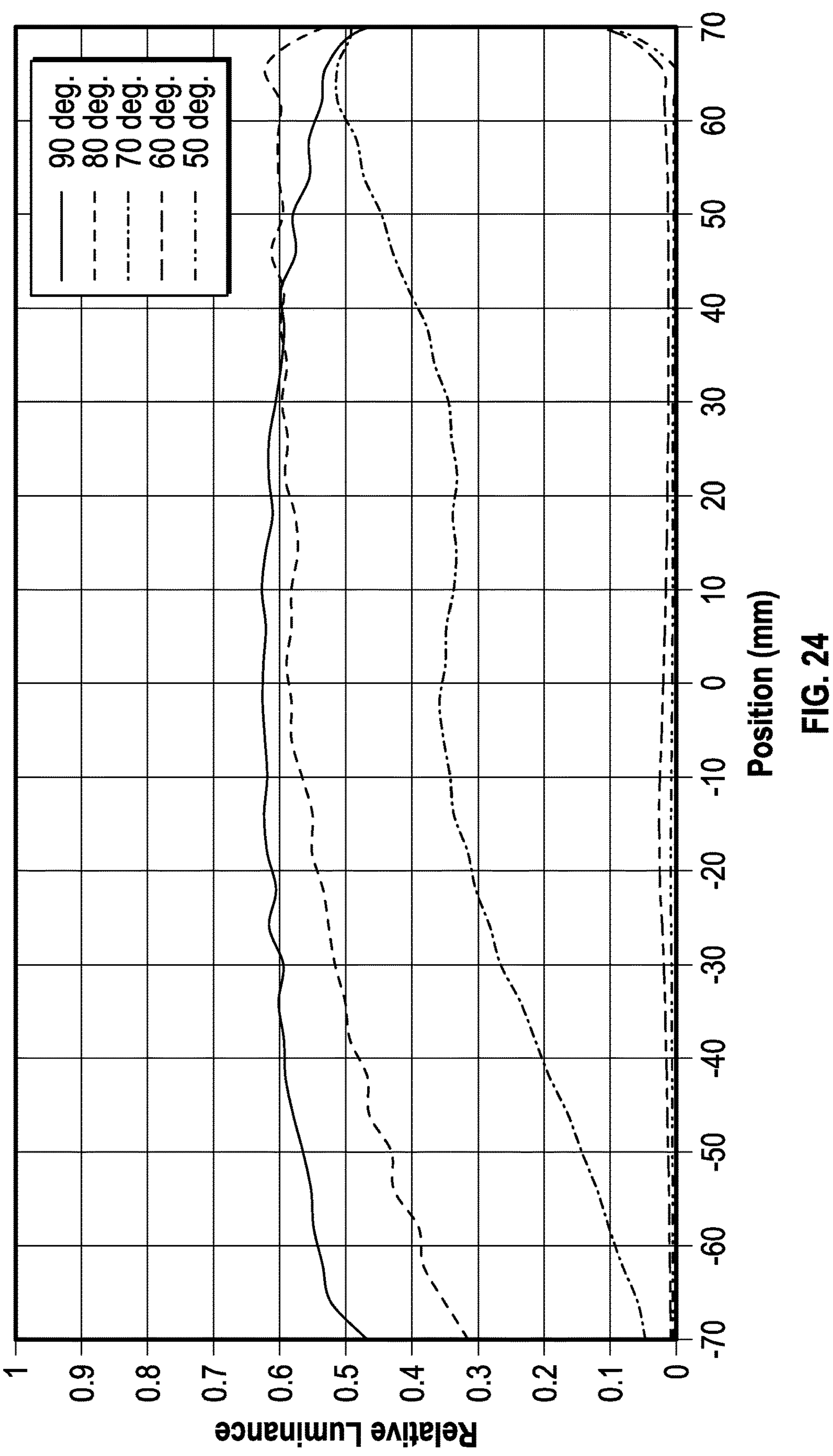

Optical modeling was carried out for an optical system as generally depicted in FIG. 1 and for a comparative optical system where the Fresnel lens was disposed on the light control film with the Fresnel facets facing away from the light source 130. The light source surface was taken to have a parabolic shape in cross-sections orthogonal to the z-axis where the shape was given by $y=\frac{1}{2}\ 0.00645\ x^2$ with y and x in mm, referring to the x-y-z coordinate system of FIG. 1. The radius of curvature at x=0 was about 155 mm. The Fresnel lens was designed such that a light ray emitted normal to the light source surface was refracted by the Fresnel lens into the y-direction. The Luminance distribution was calculated for various view angles (90 degrees is on-axis) and for various positions along the light source surface (x-coordinate). FIG. 22 shows the results for the comparative optical system. FIG. 23 shows the results for the optical system of FIG. 1 without an optically absorptive layer on the sidewalls. FIG. 24 shows the results for the optical system of FIG. 1 with an optically absorptive layer on the sidewalls (e.g., as illustrated in FIG. 11). The comparative optical system showed a bright band for view angles around 60 degrees and for x-coordinates around −40 mm. This bright band was substantially eliminated in the optical system of FIGS. 1 and 23. However, there was light leakage for view angles around 50 degrees and for x-coordinates around 55 mm which may be objectionable in some applications. This light leakage was substantially eliminated by including the optically absorptive layer on the sidewalls as shown in FIG. 24.

Figure 25:
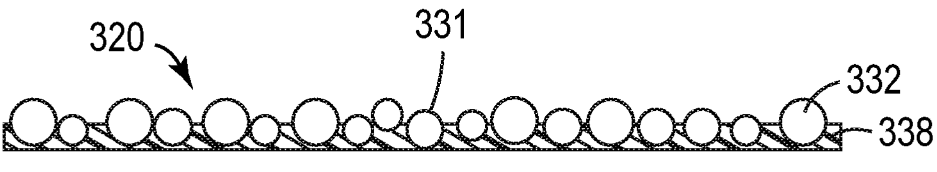
FIG. 25 is a schematic cross-sectional view of a structured layer, according to some embodiments.

FIG. 25 is a schematic cross-sectional view of a structured (e.g., microstructured) layer 320, according to some embodiments, that may be included an optical film or that may be disposed between an optical film and a light control film. The structured layer 320 can include particles or beads 332 in a binder 338. In some embodiments, the structured layer 320 is an optically diffuse layer. In some embodiments, an optically diffusive layer 320 includes a coating included beads 332 defining a structured (e.g., microstructured) major surface 331 of the coating. The structured layer 320 may be a coating applied to a major surface 114 of the optical film 110, 210, or 310, for example, or another optical film described elsewhere herein, or may be a coating applied to a light control film 120, for example, and bonded to a second layer 148, for example. Structured layer 320 can be formed by coating a layer of particles in a binder and solvent and then drying off the solvent, for example. Alternatively, a layer of the binder 338 can be coated onto a surface and then the beads can be applied to the binder, for example. Suitable methods of making structured layer 320 are described in U.S. Pat. Appl. Publ. No. 2008/0002256 (Sasagawa et al.), for example.

FIG. 26 is a schematic cross-sectional view of an optically diffusive layer 420 including particles or beads 432 dispersed in a binder 438, according to some embodiments. Any of the layers 164, 191, 148, or 144, for example, may correspond to the optically diffusive layer 420 and may include beads 432 dispersed in a binder 438. Optically diffusive layer 420 can be formed by mixing beads 432 in a binder 438 and then optionally curing the binder 438. Alternatively, the beads 432 can be mixed in the binder 438 above its melting point and then the binder can be cooled to form the layer 420.

The beads 332, 432 may be glass beads or polymethylmethacrylate beads, for example, and the binder 338, 438 may comprise silicone or an optically clear adhesive, for example. The beads may have an average diameter in a range of 1 micrometer to 10 micrometers, or 2 micrometers to 5 micrometers, for example.

Figure 27:
FIG. 27 is a schematic cross-sectional view of a structured surface or interface, according to some embodiments.

FIG. 27 is a schematic cross-sectional view of a structured (e.g., microstructured) surface or interface 824, according to some embodiments. Any of the surfaces or interfaces 114, 222, 223, 225, 226 (see, e.g., FIG. 6), for example, can correspond to structured surface or interface 824. Structured surface or interface 824 can be formed by embossing or by microreplication (e.g., cast and curing), for example, as is known in the art. Suitable microreplication techniques are described in U.S. Pat. No. 7,510,462 (Bryan et al.); 8,657,472 (Aronson et al.); and 10,605,965 (Pham et al.), for example.

FIG. 28-36 are schematic cross-sectional views of optical systems or optical stacks according to some embodiments of the present description. Each of the illustrated optical systems or optical stacks include an optical film (510, 610, 710, 810, 910, 1010, 1110, or 1210) and a light control film (220 or 520) which may be curved about an axis as described further elsewhere herein. The optical film 510, 610, 710, 810, 910, 1010, 1110, or 1210 may correspond to optical film 110, 210, or 310, for example. The light control film 220 or 520 may correspond to light control film 120 for example.

Light control film 220 includes a structured (e.g., microstructured) layer formed 121 on a substrate 123 where the structured layer 121 includes the plurality of spaced apart optically absorptive regions 124. The substrate 123 can be disposed between the optical film and the structured layer 121 or the structured layer 121 can be disposed between the optical film and the substrate 123. Light control film 520 includes a structured (e.g., microstructured) layer formed 121 on a substrate 523 where the substrate 523 has a structured (e.g., microstructured) major surface facing the optical film. Alternatively, the substrate 523 may be regarded as a layer of the optical film or as a layer disposed between the optical film and the light control film 121.

Figure 28:
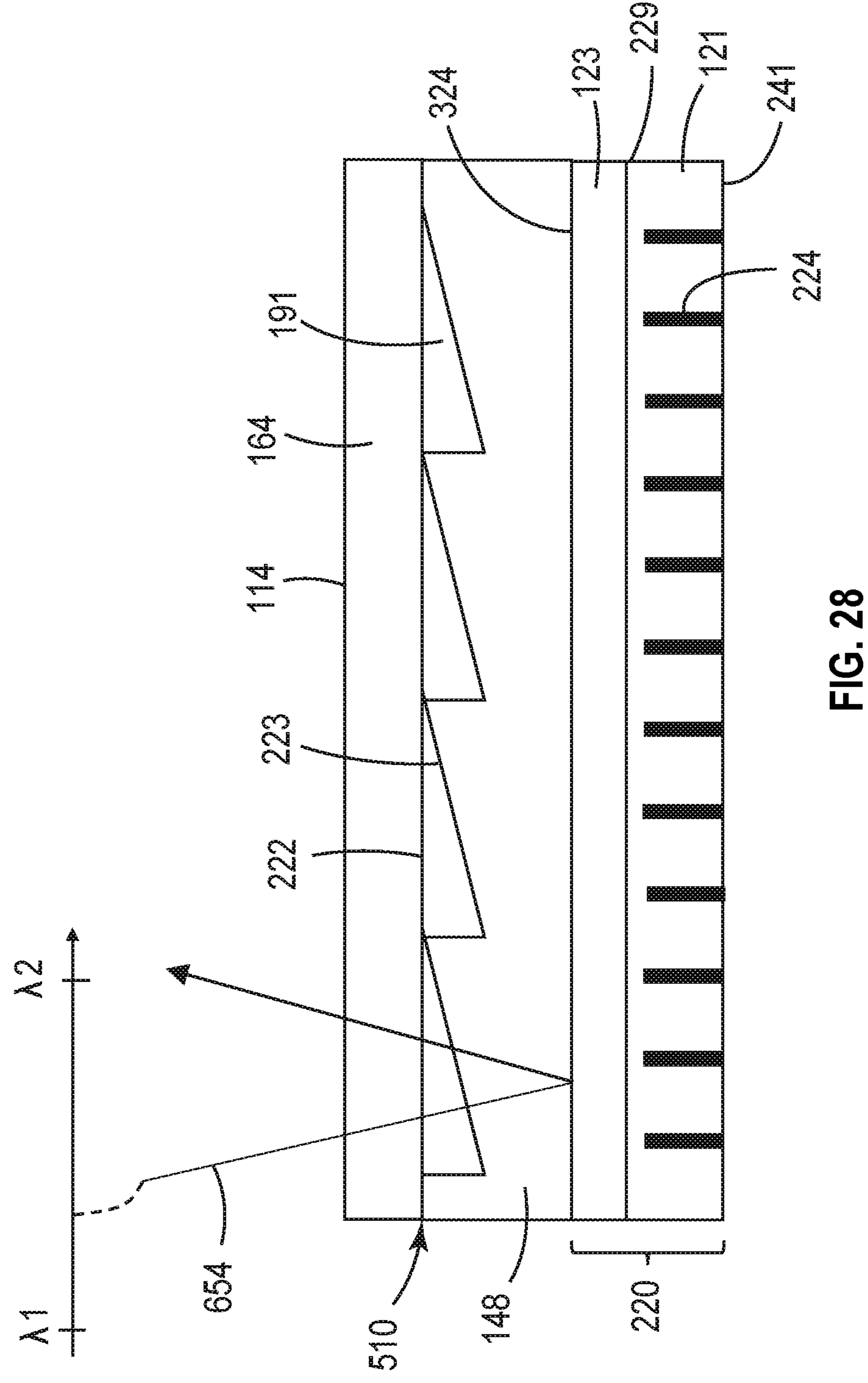
FIG. 28-36 are schematic cross-sectional views of optical systems including various reflection mitigation elements, according to some embodiments.
Figure 29:
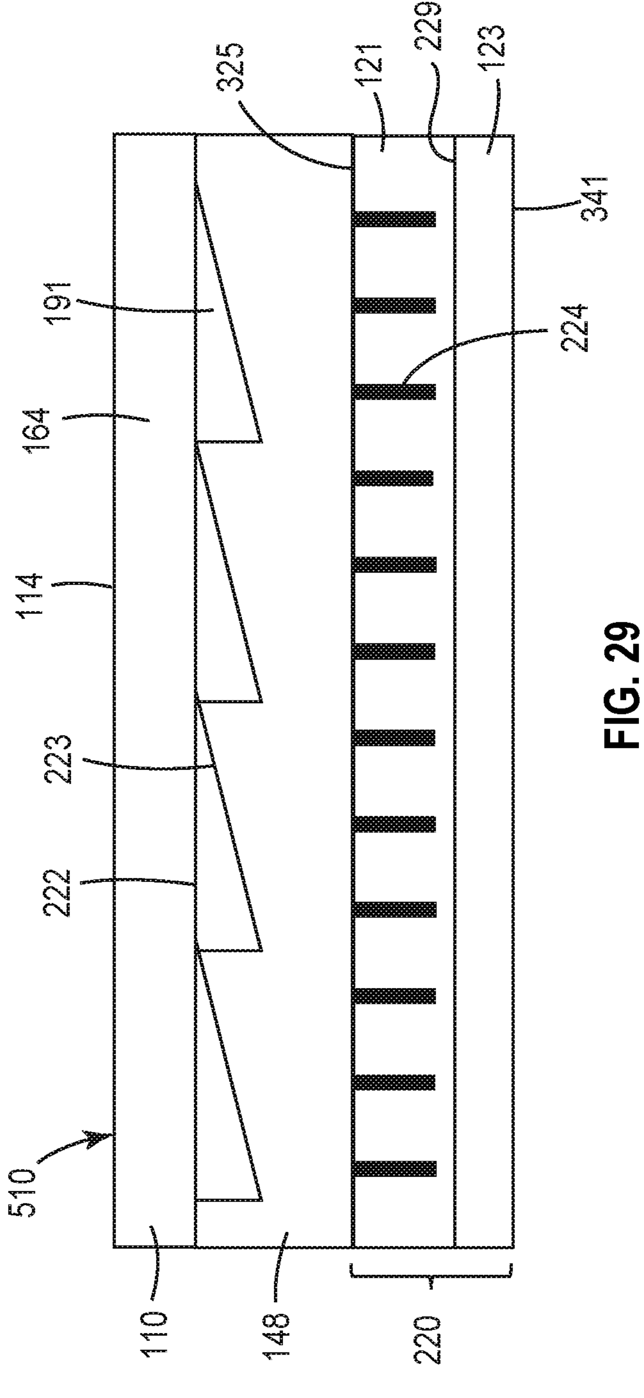
Figure 30:
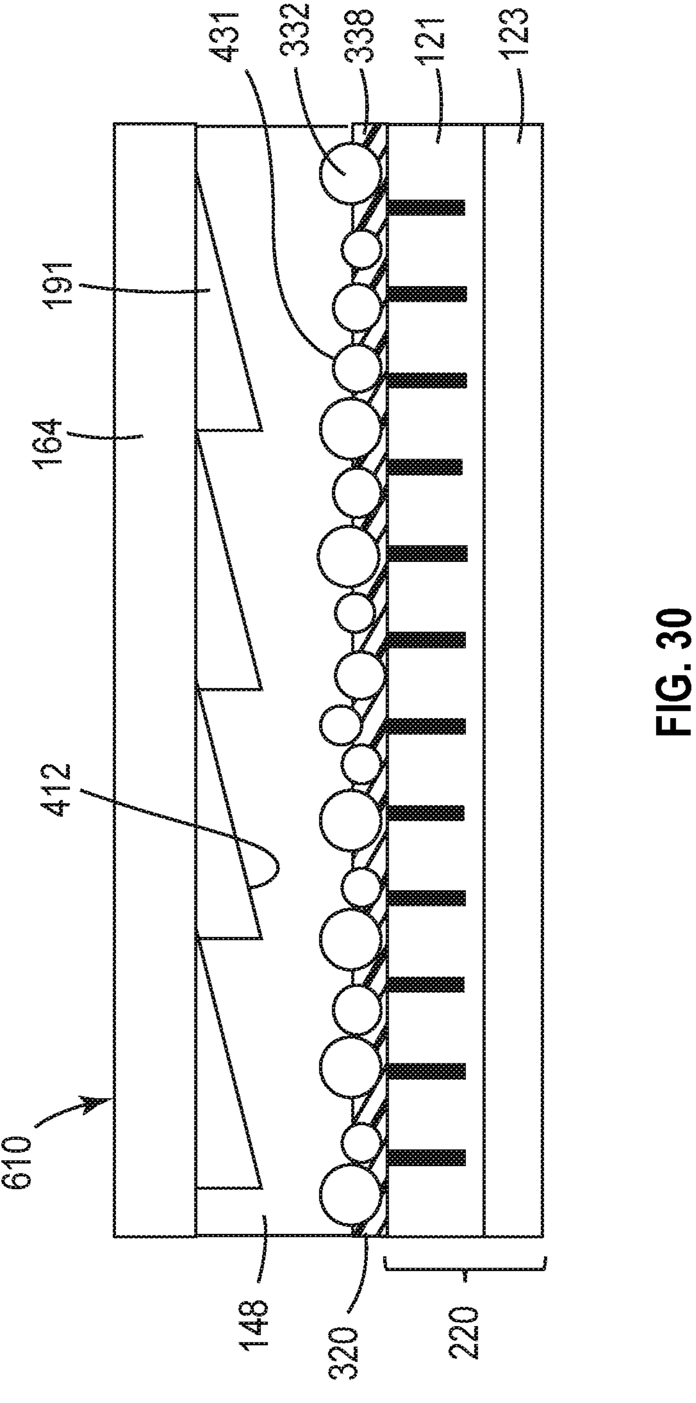
Figure 31:
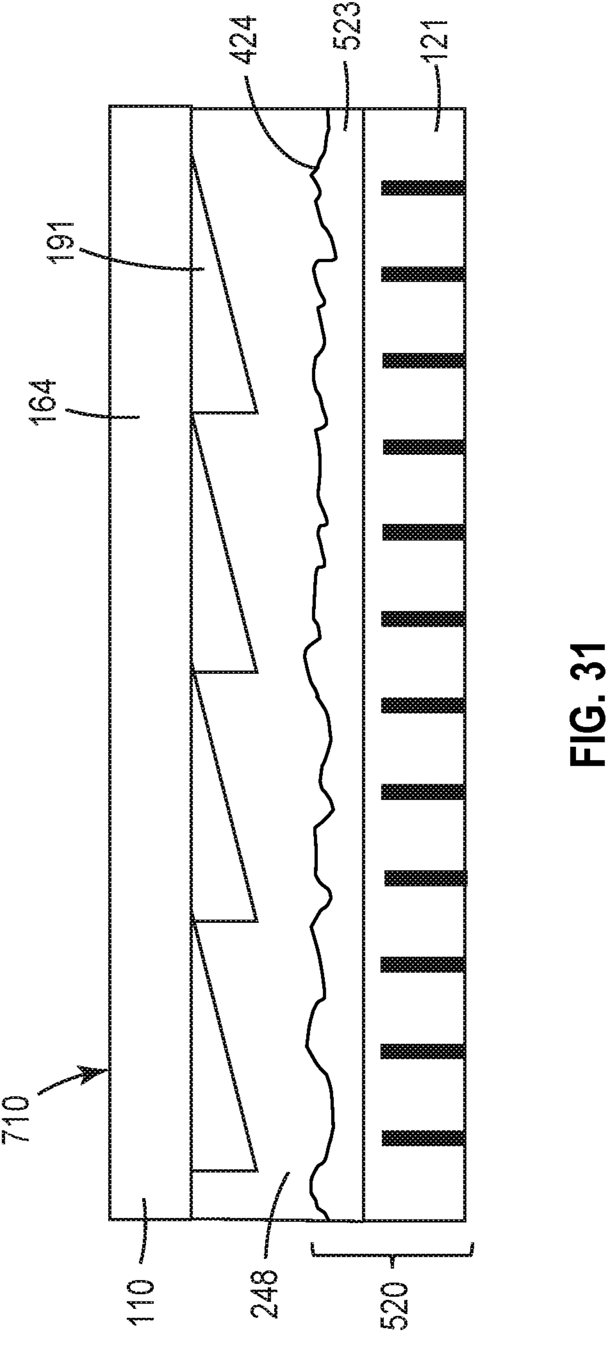
Figure 32:
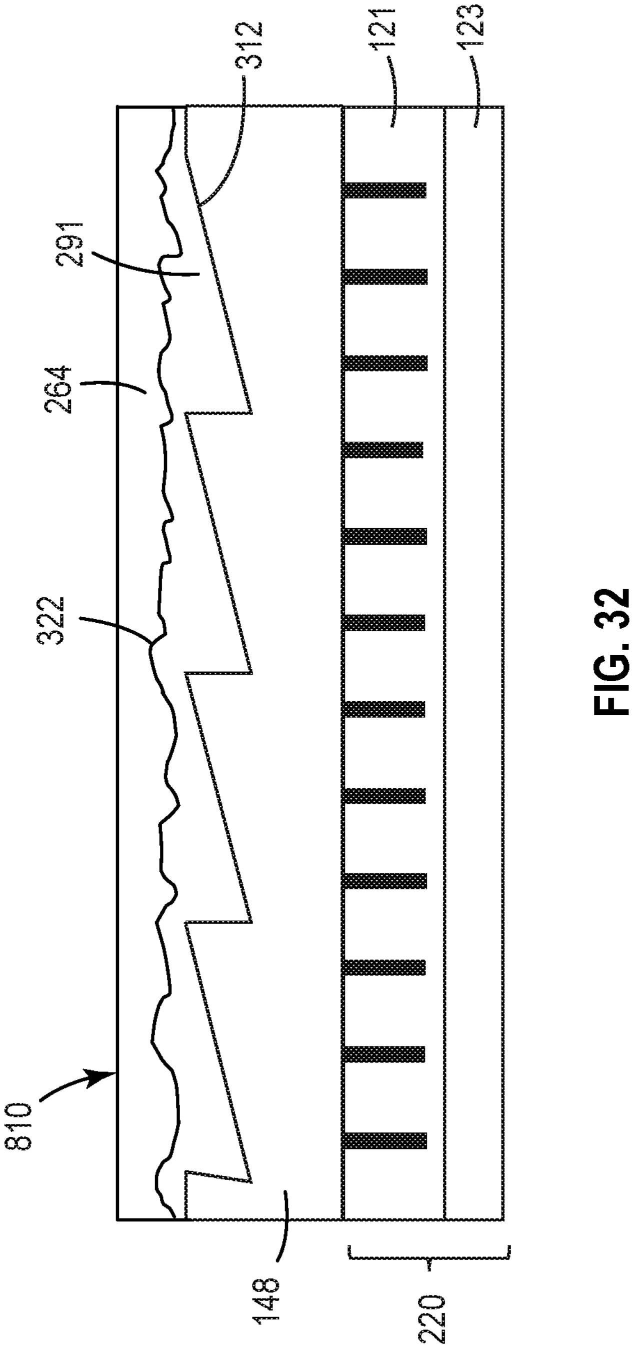
Figure 33:
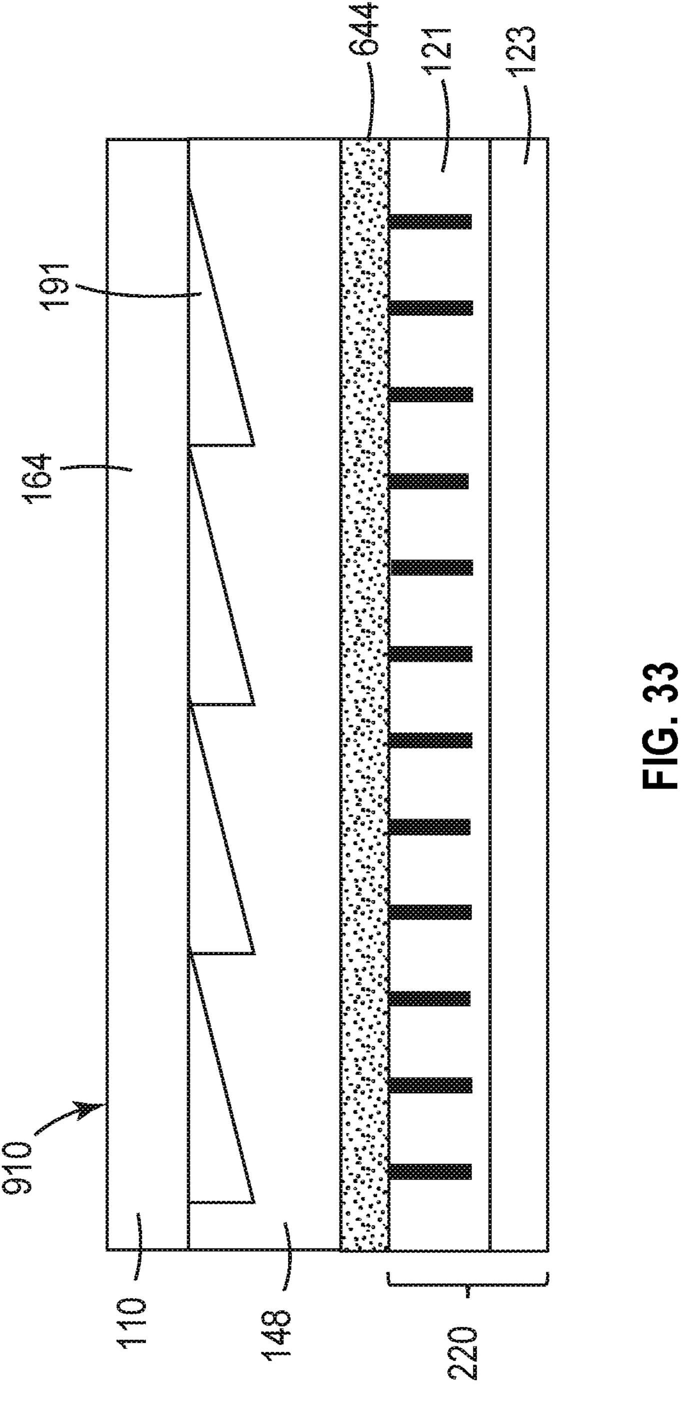
Figure 34:
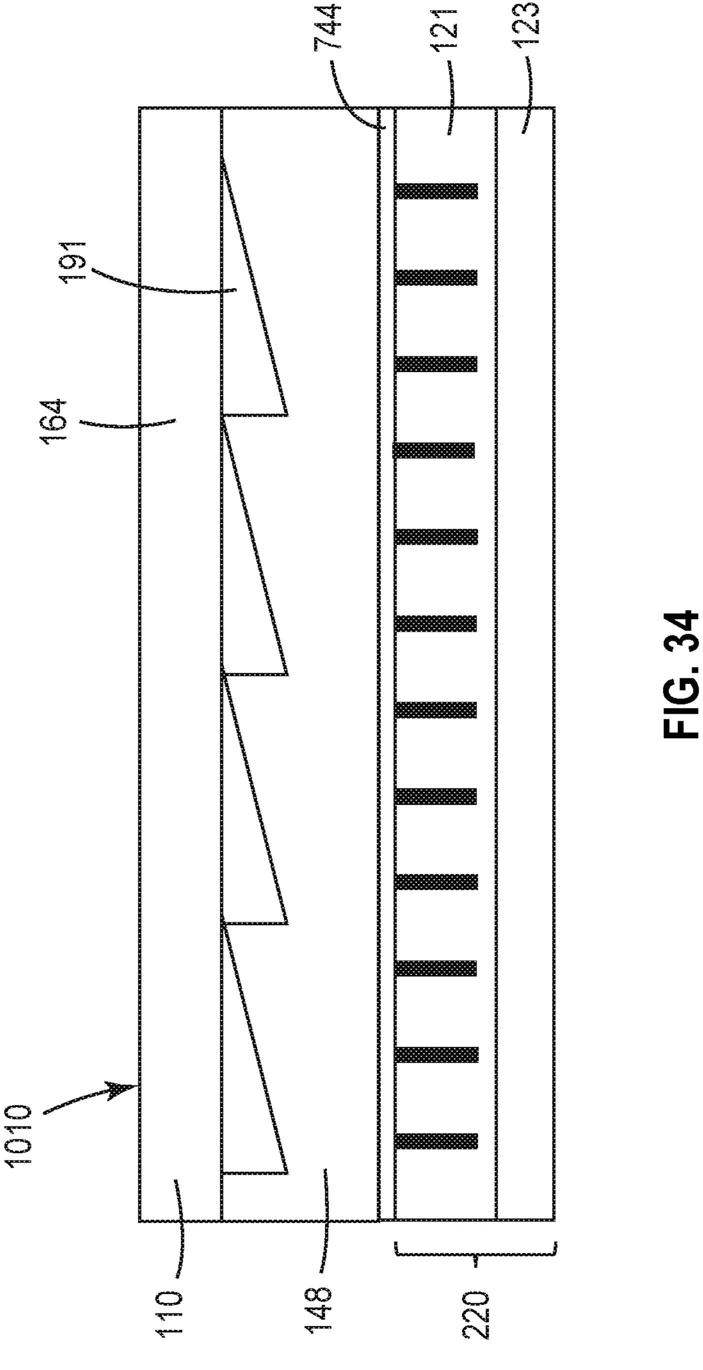

FIGS. 30-36 schematically illustrate various reflection mitigation elements that may be included in the embodiments of FIGS. 28-29. In FIG. 28, any of the layers 164, 191, 148, 123 may be optically diffusive layers (e.g., volume diffusers which may include beads in a binder as schematically shown in FIG. 26) and/or any of the surfaces or interfaces 114, 222, 223, and 324 may be structured or include an anti-reflective coating. In FIG. 29, any of the layers 164, 191, 148, 123 may be optically diffusive layers (e.g., including beads in a binder as schematically shown in FIG. 26) and/or any of the surfaces or interfaces 114, 222, 223, and 325 may be structured or include an anti-reflective coating. Such structured surfaces or interfaces or optically diffuse layers can be reflection mitigation elements adapted to mitigate undesired effects of reflection of ambient light 654 which is schematically shown as reflecting from an interface between layer 148 and layer 123 in FIG. 28. The interface 229 and/or the major surface 241, 341 of the light control film facing away from the optical film may optionally be microstructured (e.g., as schematically shown for surface or interface 824 in FIG. 27). Such structured surfaces or interfaces may be useful for defect hiding, for example. The major surface 241, 341 of the light control film may include a hard coat (e.g., a hard coat with a matte surface) for scratch resistance, example. Similarly, a hard coat may optionally be included on major surface 114.

In some embodiments, the optical film includes a second layer 148 disposed on and contacting at least a majority of the first major surface of the first layer 191, 291, 391. In some embodiments, the at least a majority of the first major surface includes at least 80% or at least 90% or at least 95% of a total area of the first major surface. In some embodiments, the second layer 148 is disposed on, and has a major surface 149 (see, e.g., FIG. 6) facing and substantially conforming to, the first major surface of the first layer 191, 291, 391. In some embodiments, the second layer 148 bonds the optical film to the light control film. In some embodiments, the second layer 148 has a lower refractive index (e.g., by at least 0.05, or at least 0.1, or at least 0.15 and, in some embodiments, by up to 0.5, or up to 0.4, for example) than the first layer for at least one wavelength (e.g., 532 nm, 550 nm, or 633 nm) in a range of about 400 nm to about 700 nm, or about 420 nm to about 680 nm, or about 450 nm to about 650 nm. For example, the wavelength range can be from $\lambda 1$ to $\lambda 2$ (see, e.g., FIG. 28) where $\lambda 1$ can be about 400 nm, about 420 nm, or about 450 nm and λ2 can be about 700 nm, or about 680 nm, or about 650 nm).

Figure 35:
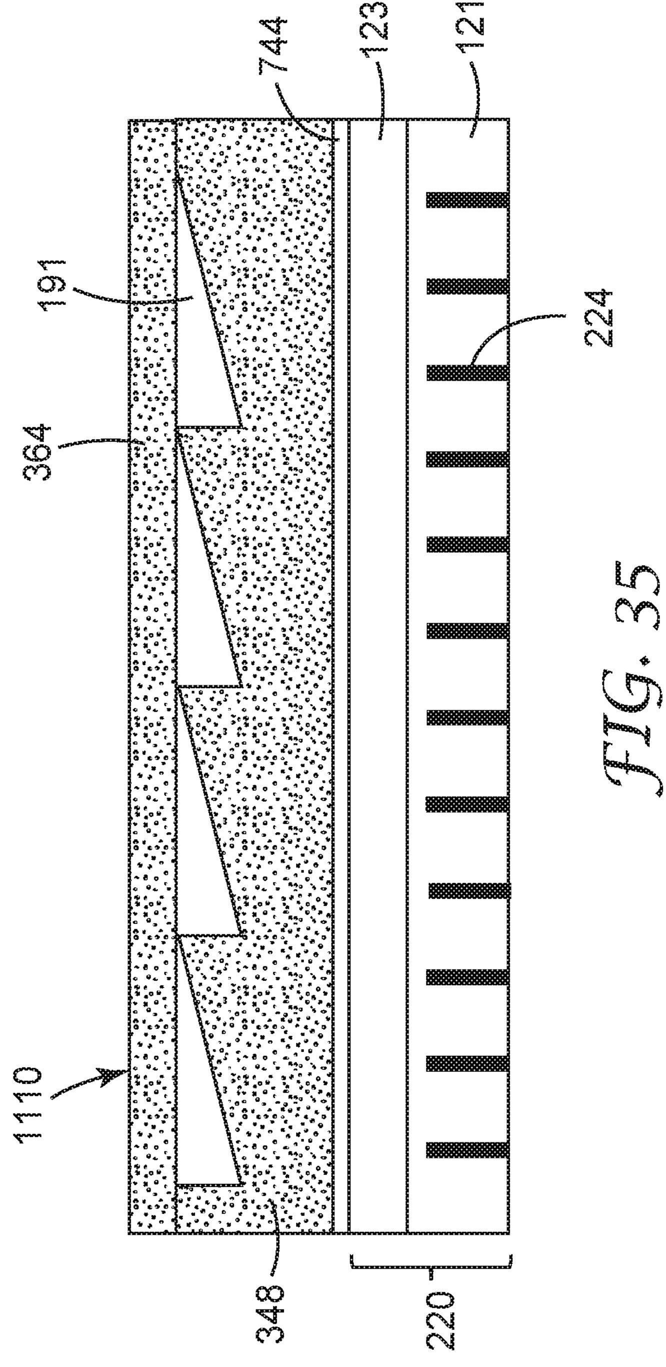
Figure 36:
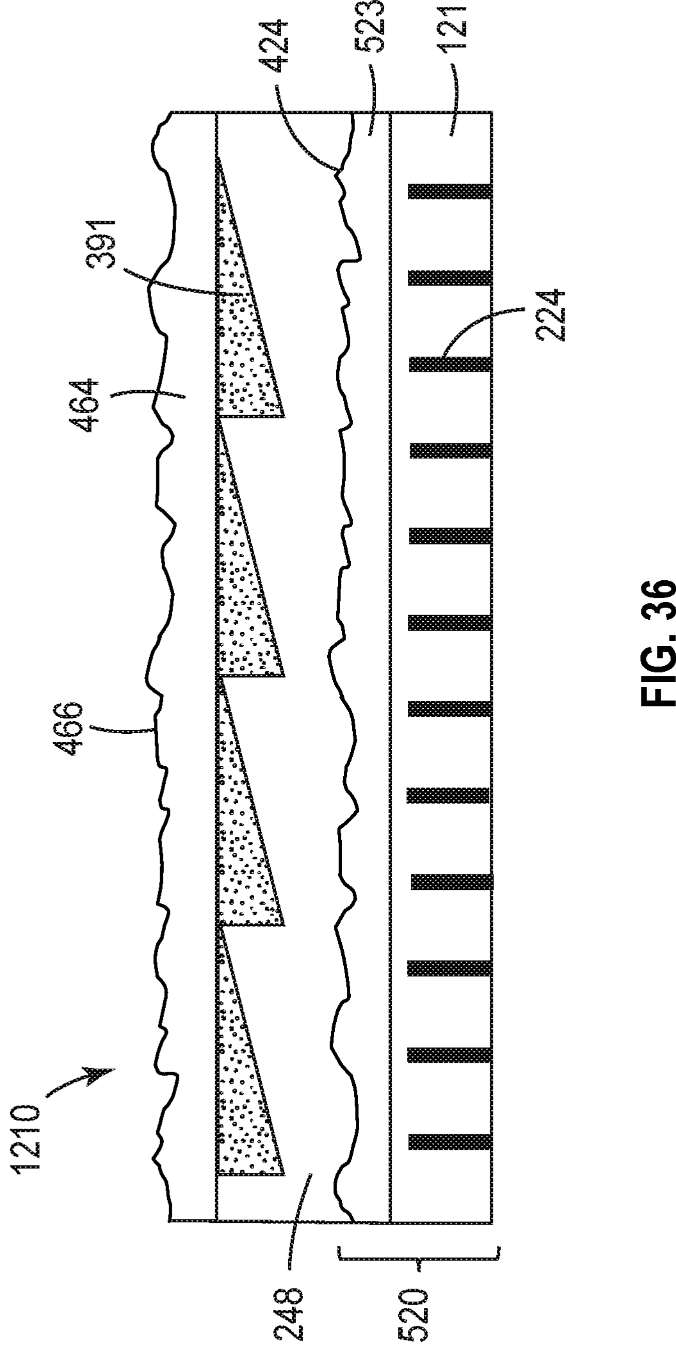

Optical film 610 includes a structured layer 320 disposed between second layer 148 and light control film 220. Alternatively, the structured layer 320 may be considered to be disposed between the optical film and the light control film. Optical film 710 includes a structured surface 424 at an interface of a second layer 248 (e.g., corresponding to second layer 148 but having a structured surface) with light control film 520. Optical film 810 includes a structured interface 322 between first layer 291 and substrate 264. Optical film 910 includes an optically diffusive layer 644 disposed between second layer 148 and light control film 220. Alternatively, the optically diffusive layer 644 may be considered to be disposed between the optical film and the light control film 220. Optical film 1010 includes an anti-reflective coating 744 disposed between second layer 148 and light control film 220. Alternatively, the anti-reflective coating 744 may be considered to be disposed between the optical film and the light control film 220. As shown in FIGS. 35-36, for example, an optical system can include more than one reflection mitigation element. Optical film 1110 includes the first layer 191 disposed on an optically diffusive layer 364. Optical film 1110 also includes an optically diffusive second layer 348, which may correspond to second layer 148 but may include beads dispersed in a binder, for example. Optical film 1110 also includes anti-reflective coating 744. Alternatively, the anti-reflective coating 744 may be considered to be disposed between the optical film and the light control film 220. Optical film 1210 includes an optically diffusive first layer 391 (e.g., corresponding to first layer 191 but including beads in a binder) and includes a structured surface 466 of the substrate 464 and includes structured surface 424 of the second layer 248. Alternatively, the layers 248 and 523 may be considered to be disposed between the optical film (including layers 391, 464) and the light control film 121. In some embodiments, the at least one reflection mitigation element includes a plurality of beads dispersed in the first layer 391 as schematically indicated in FIG. 36. In embodiments where the first layer 391 includes beads, the quantity (e.g., concentration) of the beads may be limited to avoid interference with the desired refractive properties of the layer.

The anti-reflective coating 744 can include one or more layers (e.g., one or more ¼ wave layers or a combination of ¼ and ½ wave layers), which may be vapor deposited, for example, as is known in the art.

In some embodiments, the at least one reflection mitigation element includes a microstructured interface (e.g., 322, 424, 431). In some embodiments, the optical film further includes: a second layer (e.g., 148, 248, 348) disposed on the first major surface of the first layer, where the second layer has a lower refractive index than the first layer for at least one wavelength in a range of about 400 nm to about 700 nm: and a third layer (e.g., 320, 523) disposed between the second layer and the light control film, where an interface (e.g., 424, 431) between the second layer and the third layer includes the microstructured interface. In some embodiments, the second layer contacts at least a majority of the first major surface of the first layer and/or has a major surface facing and substantially conforming to the first major surface of the first layer. In some embodiments, the third layer is an optical adhesive bonding the second layer to the light control film. In some embodiments, the third layer includes a structured layer bonded to the light control film, where the second layer includes an adhesive bonded to the first major surface of the first layer and to a structured major surface of the structured layer. In some embodiments, the adhesive is or includes a silicone adhesive. In some embodiments, the optical film further includes: a second layer disposed on the first major surface of the first layer where the second layer bonds the optical film to the light control film and the second layer has a lower refractive index than the first layer for at least one wavelength in a range of about 400 nm to about 700 nm. An interface between the second layer and the light control film can include a microstructured interface (e.g., 424) and/or the at least one reflection mitigation element can include a microstructured major surface 424 of the second layer facing 248 the light control film 520. In some embodiments, the light control film includes a structured layer 121 formed on a substrate 123, 523, where the structured layer 121 includes the plurality of spaced apart optically absorptive regions 224 and the substrate 523 is disposed between the optical film and the structured layer 121. In some embodiments, the light control film includes a structured layer 121 formed on a substrate 123, 523, where the structured layer 121 includes the plurality of spaced apart optically absorptive regions 224 and the structured layer 121 is disposed between the optical film and the substrate. In some embodiments, an interface between the microstructured layer and the substrate is structured (e.g., interface 229 in FIGS. 28-29 can be structured as shown in FIG. 27 for interface 824).

In some embodiments, the at least one reflection mitigation element includes a microstructured interface 322, where the optical film includes a substrate 264, the first layer 291 is disposed on the substrate with the first major surface 312 of the first layer facing away from the substrate, and an interface 322 between the first layer 291 and the substrate 264 includes the microstructured interface.

In some embodiments, the optical film (e.g., optical film 1210 schematically illustrated in FIG. 36) includes a substrate where the first layer is disposed on the substrate with the first major surface of the first layer facing away from the substrate, and where the at least one reflection mitigation element includes a microstructured major surface 466 of the substrate facing away from the first layer.

In some embodiments, the at least one reflection mitigation element includes an optically diffusive layer. In some embodiments, the optically diffusive layer includes beads (e.g., 432) dispersed in a binder (e.g., 438). In some embodiments, the optically diffusive layer includes a coating 320 including beads 332 defining a structured major surface 331 of the coating. In some embodiments, the optically diffusive layer includes a microstructured major surface 331, 824. In some embodiments, the optically diffusive layer (e.g., layer 348) is disposed on and contacts at least a majority of the first major surface of the optical film. In some embodiments, the optically diffusive layer is disposed on, and has a major surface facing and substantially conforming to, the first major surface of the first layer. In some embodiments, the first layer 191 is disposed on a substrate 364 where the substrate is or includes the optically diffusive layer. In some embodiments, the optical film further includes a second layer disposed on the first major surface of the first layer, where the second layer has a lower refractive index than the first layer for at least one wavelength in a range of about 400 nm to about 700 nm, and where the optically diffusive layer 320, 644 is disposed between the second layer and the light control film. The second layer may contact at least a majority of the first major surface of the optical film and/or the second layer may have a major surface facing and substantially conforming to the first major surface of the optical film.

In some embodiments, the at least one reflection mitigation element includes an anti-reflection coating 744. In some embodiments, the optical film further includes a second layer disposed on the first major surface of the first layer, where the second layer has a lower refractive index than the first layer for at least one wavelength in a range of about 400 nm to about 700 nm; and a third layer disposed between the second layer and the light control film, where the anti-reflection coating is disposed between the second and third layers (e.g., the substrate 123 in FIG. 35 may be considered to be a third layer of the optical film 1110 or the light control film may omit the substrate layer and layer 123 may be an adhesive layer). In some embodiments, the third layer is an optical adhesive bonding the second layer to the light control film. The adhesive can be or include a silicone adhesive, for example. In some embodiments, the optical film further includes a second layer disposed on the first major surface of the first layer, where the second layer bonds the optical film to the light control film, where the second layer has a lower refractive index than the first layer for at least one wavelength in a range of about 400 nm to about 700 nm, and where the anti-reflection coating 744 is disposed between the second layer and the light control film. The second layer may contact at least a majority of the first major surface of the optical film and/or the second layer may have a major surface facing and substantially conforming to the first major surface of the optical film. The anti-reflection coating 744 may be disposed on, and substantially conform to, a major surface of the light control film facing the optical film.

In some embodiments, the optical film (e.g., 610 schematically illustrated in FIG. 30) further includes: a second layer 148 disposed on the first major surface 412 of the first layer 191, where the second layer 148 has a lower refractive index than the first layer for at least one wavelength in a range of about 400 nm to about 700 nm; and a third layer disposed between the second layer to the light control film, where the third layer includes a structured layer 320 bonded to the light control film 220, and where the second layer 148 includes an adhesive bonded to the first major surface of the first layer 191 and to a structured major surface 431 of the structured layer 320. As described further elsewhere herein, the second layer may contact at least a majority of the first major surface of the optical film and/or the second layer may have a major surface facing and substantially conforming to the first major surface of the optical film.

In some embodiments, at least one reflection mitigation element is disposed on a side of the light control film facing the optical film. For example, the embodiment of FIG. 35 may be described as including an optical film that includes layers 191 and 364 disposed on a light control film that includes layers 123 and 121 where layers 348 and 744 are disposed between the optical film and the light control film. As another example, the embodiment of FIG. 36 may be described as including an optical film that includes layers 464 and 391 disposed on a light control film including layer 121 where layers 248 and 523 are disposed between the optical film and the light control film.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:

an optical film curved about a first axis and comprising a first layer comprising a microstructured first major surface and an opposite second major surface, the microstructured first major surface defining a linear Fresnel lens comprising a plurality of Fresnel elements extending along the first axis, each Fresnel element comprising an optical facet and a sidewall meeting the optical facet at a ridge of the Fresnel element, wherein for each Fresnel element in at least a majority of the Fresnel elements, an optically absorptive layer is disposed on the sidewall, the optically absorptive layer having an average thickness t, 100 nm<t<1 micrometer; and a light control film disposed proximate the optical film, the light control film curved about the first axis and substantially coextensive with the optical film, the first major surface of the optical film disposed between the light control film and the second major surface of the optical film so that the first major surface of the optical film faces the light control film, the light control film comprising a plurality of spaced apart optically absorptive regions extending along the first axis, each optically absorptive region extending substantially normally to a major surface of the light control film, wherein at least one of the optical film or at least one layer disposed between the optical film and the light control film comprises at least one reflection mitigation element.

2. The optical system of claim 1, wherein the at least one reflection mitigation element comprises at least one of a structured surface other than the microstructured first major surface, an anti-reflection coating, or a volume diffuser.

3. The optical system of claim 1, wherein the at least one reflection mitigation element comprises a microstructured interface.

4. The optical system of claim 3, wherein the optical film further comprises:

a second layer disposed on, and having a major surface facing and substantially conforming to, the first major surface of the first layer, the second layer having a lower refractive index than the first layer for at least one wavelength in a range of about 400 nm to about 700 nm; and a third layer disposed between the second layer and the light control film, wherein an interface between the second layer and the third layer comprises the microstructured interface.

5. The optical system of claim 3, wherein the optical film comprises a substrate, the first layer disposed on the substrate with the first major surface of the first layer facing away from the substrate, wherein an interface between the first layer and the substrate comprises the microstructured interface.

6. The optical system of claim 1, wherein the optical film further comprises:

a second layer disposed on, and having a major surface facing and substantially conforming to, the first major surface of the first layer, the second layer bonding the optical film to the light control film, the second layer having a lower refractive index than the first layer for at least one wavelength in a range of about 400 nm to about 700 nm, wherein the at least one reflection mitigation element comprises a microstructured major surface of the second layer facing the light control film.

7. The optical system of claim 1, wherein the optical film comprises a substrate, the first layer disposed on the substrate with the first major surface of the first layer facing away from the substrate, wherein the at least one reflection mitigation element comprises a microstructured major surface of the substrate facing away from the first layer.

8. The optical system of claim 1, wherein the at least one reflection mitigation element comprises an optically diffusive layer.

9. The optical system of claim 8, wherein the optically diffusive layer is disposed on, and has a major surface facing and substantially conforming to, the first major surface of the first layer.

10. The optical system of claim 8, wherein the first layer is disposed on a substrate, the substrate comprising the optically diffusive layer.

11. The optical system of claim 8, wherein the optically diffusive layer comprises a plurality of beads dispersed in a binder.

12. The optical system of claim 1, wherein the at least one reflection mitigation element comprises an anti-reflection coating.

13. The optical system of claim 12, wherein the optical film further comprises:

a second layer disposed on, and having a major surface facing and substantially conforming to, the first major surface of the first layer, the second layer bonding the optical film to the light control film, the second layer having a lower refractive index than the first layer for at least one wavelength in a range of about 400 nm to about 700 nm, wherein the anti-reflection coating is disposed between the second layer and the light control film.

14. An optical system comprising:

a light source;

an optical film curved about a first axis and comprising a first layer comprising a microstructured first major surface and an opposite second major surface, the microstructured first major surface defining a linear Fresnel lens comprising a plurality of Fresnel elements extending along the first axis; and a light control film curved about the first axis and substantially coextensive with the optical film, the light control film disposed between the light source and the optical film, the first major surface of the optical film disposed between the light control film and the second major surface of the optical film so that the first major surface of the optical film faces the light control film, the light control film comprising a plurality of spaced apart optically absorptive regions extending along the first axis, each optically absorptive region extending substantially normally to a major surface of the light control film, wherein at least one of the optical film or at least one layer disposed between the optical film and the light control film comprises at least one reflection mitigation element.

15. The optical system of claim 14, wherein each Fresnel element comprises an optical facet and a sidewall meeting the optical facet at a ridge of the Fresnel element, wherein for each Fresnel element in at least a majority of the Fresnel elements, an optically absorptive layer is disposed on the sidewall, the optically absorptive layer having an average thickness t, 100 nm<t<1 micrometer.

16. The optical system of claim 14, wherein the at least one reflection mitigation element comprises a microstructured interface.

17. The optical system of claim 16, wherein the optical film further comprises:

a second layer disposed on, and having a major surface facing and substantially conforming to, the first major surface of the first layer, the second layer having a lower refractive index than the first layer for at least one wavelength in a range of about 400 nm to about 700 nm; and a third layer disposed between the second layer and the light control film, wherein an interface between the second layer and the third layer comprises the microstructured interface.

18. The optical system of claim 16, wherein the optical film comprises a substrate, the first layer disposed on the substrate with the first major surface of the first layer facing away from the substrate, wherein an interface between the first layer and the substrate comprises the microstructured interface.

19. The optical system of claim 14, wherein the optical film further comprises:

a second layer disposed on, and having a major surface facing and substantially conforming to, the first major surface of the first layer, the second layer bonding the optical film to the light control film, the second layer having a lower refractive index than the first layer for at least one wavelength in a range of about 400 nm to about 700 nm, wherein the at least one reflection mitigation element comprises a microstructured major surface of the second layer facing the light control film.

20. The optical system of claim 14, wherein the optical film comprises a substrate, the first layer disposed on the substrate with the first major surface of the first layer facing away from the substrate, wherein the at least one reflection mitigation element comprises a microstructured major surface of the substrate facing away from the first layer.

* * * * *